(12) United States Patent
Fischel

(10) Patent No.: US 8,187,560 B2
(45) Date of Patent: May 29, 2012

(54) FUEL REFORMERS UTILIZING TAYLOR VORTEX FLOWS

(75) Inventor: Halbert Fischel, Santa Barbara, CA (US)

(73) Assignee: Global Energy Science, LLC, Santa Barbara, CA (US)

( * ) Notice: Subject to any disclaimer, the term of this patent is extended or adjusted under 35 U.S.C. 154(b) by 230 days.

(21) Appl. No.: 12/800,710

(22) Filed: May 20, 2010

(65) Prior Publication Data

US 2010/0330445 A1  Dec. 30, 2010

Related U.S. Application Data

(60) Provisional application No. 61/220,583, filed on Jun. 26, 2009.

(51) Int. Cl.
*B01J 8/00* (2006.01)
*H01M 8/06* (2006.01)

(52) U.S. Cl. ........ 422/625; 422/187; 422/629; 422/630; 422/631; 422/634; 422/638; 429/69; 429/68; 429/67; 429/498; 429/400; 429/535; 429/444; 429/499; 429/164; 429/122; 429/525; 429/524; 429/526; 429/527; 429/528; 429/497; 429/480; 429/423; 429/416; 429/424; 429/425

(58) Field of Classification Search .................. 422/187, 422/625, 629, 630, 631, 634, 638; 429/67–69, 429/400–535
See application file for complete search history.

(56) References Cited

U.S. PATENT DOCUMENTS

| | | | |
|---|---|---|---|
| 5,830,593 A | 11/1998 | Nielson | |
| 6,319,293 B1 | 11/2001 | Debe et al. | |
| 6,471,392 B1 | 10/2002 | Holl | |
| 7,488,547 B1 | 2/2009 | Iacovelli | |
| 2006/0062702 A1 | 3/2006 | Hagemeister et al. | |
| 2007/0020142 A1 | 1/2007 | Federspiel et al. | |
| 2008/0149050 A1 | 6/2008 | Shih et al. | |

OTHER PUBLICATIONS

Gabe et al, The rotating cylinder electrode: a recent development, Reviews of Applied Electrochemistry 6, J. of Applied Electrochemistry 13 (1983) pp. 3-22.
Gabe et al, The rotating cylinder electrode: its continued development and application, Reviews of Applied Electrochemistry 49, J. of Applied Electrochemistry 28 (1998) pp. 759-780.
Bagotsky, Fundamentals of Chemistry, Second Edition, John Wiley & Sons, Inc., Hoboken, NJ, USA, © 2006, §4.4—Convective Transport, pp. 60-67.
Newman, Electrochemical Systems, Third Edition, John Wiley & Sons, Inc., Hoboken, NJ, USA, © 2004, Chapter 17—Convective-Transport Problems, §17.3-§17.8, pp. 382-399.
Taylor, Stability of a Viscous Liquid Contained Between Two Rotating Cylinders, Philosophical Transactions of the Royal Society of London. Series A, Containing Papers of a Mathematical of Physical Character, vol. 223 (1923) pp. 289-343.
Newman, Electrochemical Systems, Third Edition, John Wiley & Sons, Inc., Hoboken, NJ, USA, © 2004, Chapter 1—Introduction, §1.4 Transport, pp. 8-18.

*Primary Examiner* — Kaity V. Handal
(74) *Attorney, Agent, or Firm* — Sheldon L. Epstein; Malcolm J. Chisholm, Jr.; Pamela J. Curbelo

(57) ABSTRACT

Steam, partial oxidation and pyrolytic fuel reformers (14 or 90) with rotating cylindrical surfaces (18, 24 or 92, 96) that generate Taylor Vortex Flows (28 or 98) and Circular Couette Flows (58, 99) for extracting hydrogen from hydrocarbon fuels such as methane ($CH_4$), methanol ($CH_3OH$), ethanol ($C_2H_5OH$), propane ($C_3H_8$), butane ($C_4H_{10}$), octane ($C_8H_{18}$), kerosene ($C_{12}H_{26}$) and gasoline and hydrogen-containing fuels such as ammonia ($NH_3$) and sodium borohydride ($NaBH_4$) are disclosed.

30 Claims, 9 Drawing Sheets

AXIAL   FLOW

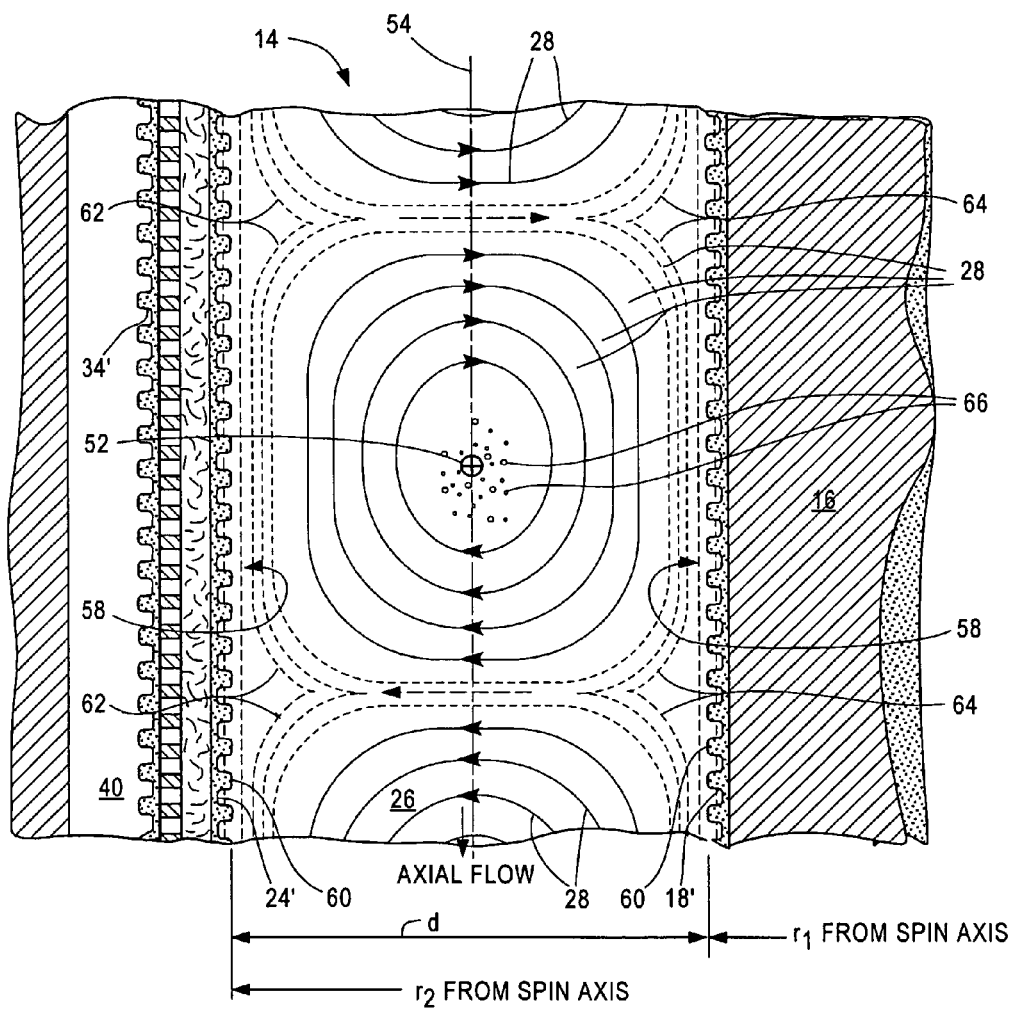

FUEL REFORMERS UTILIZING TAYLOR VORTEX FLOWS

CROSS-REFERENCE TO RELATED APPLICATIONS

This application claims the benefit of my U.S. Provisional Application No. 61/220,583 filed 26 Jun. 2009, which is incorporated herein by reference.

This application, identified as Case B, is related to my following applications:
- Case A: Electrochemical Cells Utilizing Taylor Vortex Flows, application Ser. No. 12/800,658, now U.S. Pat. No. 8,017,261 of 13 Sep. 2011;
- Case C: Chemical Process Accelerator Systems Utilizing Taylor Vortex Flows, application Ser. No. 12/800,657, now U.S. Pat. No. 8,147,767 of 2012;
- Case D: Direct Reaction Fuel Cells Utilizing Taylor Vortex Flows, application Ser. No. 12/800,672, now U.S. Pat. No. 7,972,747 of 5 Jul. 2011; and
- Case E: Dynamic Accelerated Reaction Batteries Utilizing Taylor Vortex Flows, filed application Ser. No. 12/800,709, now U.S. Pat. No. 7,964,301 of 21 Jun. 2011 with Philip Michael Lubin and Daniel Timothy Lubin.

Case A, Case B (this case), Case C, Case D and Case E were all filed on the same day. All of these applications have been assigned to the same assignee. The other applications are incorporated herein by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of hydrogen extraction reformers (U.S. Class 48/61, Int. Class B01J) having means for providing relative rotary motion between a portion of the reformer and a fuel to create Taylor Vortex Flows (TVF) that accelerate chemical reactions and sequester contaminants.

2. Description of Related Art

Hydrogen extraction reformers, also known as fuel processors, fuel reformers or reformers, are used to extract hydrogen from hydrocarbon fuels such as methane ($CH_4$), methanol ($CH_3OH$), ethanol ($C_2H_5OH$), propane ($C_3H_8$), butane ($C_4H_{10}$), octane ($C_8H_{18}$), kerosene ($C_{12}H_{26}$) and gasoline as well as other hydrogen-bearing chemicals such as ammonia ($NH_3$) and sodium borohydride ($NaBH_4$). Hydrogen gas is extracted for a number of uses including lighting, chemical manufacturing and fuel for electrochemical fuel cells that generate electricity—as disclosed in Case A, cited above—as well as conventional fuel cells.

Extraction of hydrogen has been accomplished by several methods. Pyrolysis or "cracking" uses catalysts at high temperatures to force breakage of hydrogen bonds to other elements. Chemical processes at lower temperatures use additional agents and a catalyst to promote disassociation. Examples of the latter such as steam-reforming or partial oxidation use heat and water to promote oxidation reactions such as $CH_4+3H_2O \rightarrow CO+3H_2+2H_2O$ or $CH_3OH+H_2O \rightarrow 2H_2+2CO$ usually followed by the water shift reaction, $CO+H_2O \rightarrow H_2+CO_2$. All these reactions are reversible and do not go to completion in either direction unless one of the constituents (e.g. $H_2$) is continuously removed from the reformer. This occurs in direct internal reformulation (DIR) where $H_2$ is extracted as soon as it is separated to be used as fuel in a fuel cell (Case A) or conveyed to external storage from a stand alone reformer.

The most environmentally benign of the reformer processes is pyrolysis, which generates hydrogen gas containing carbon as soot (C). Other reforming processes, such as steam reforming, produce carbon monoxide (CO) or carbon dioxide ($CO_2$) as environmental contaminants in various concentrations depending upon specific attributes of the process employed. These gasses can poison catalysts.

Where fuel contains sulphur (S), sulphur or its compounds also become additional contaminants. Even where sulphur contaminants are present in low concentrations, they can foul or destroy catalysts and other components in chemical reactors. The same is true for free carbon. Some fuel cells chemical processes cannot tolerate even minute amounts of carbon, carbon monoxide, carbon dioxide or sulphur oxides so their reformers require external purifiers that add cost and complexity to the reformers.

Reformers have been a subject of continuous engineering and improvement for over one-hundred years. Objectives include a) higher reaction rates b) further elimination of contaminants without need of external purifiers, c) reduction of capital and operating costs, especially in connection with catalyst maintenance and d) diminution in size.

SUMMARY OF THE INVENTION

This invention addresses all four of the goals described above. As example embodiments, this disclosure describes:
- A Direct Internal Reformer (DIR) used in conjunction with electrochemical cells utilizing Taylor Vortex Flows (TVF), such as those described in Case A, and
- An external fuel reformer for use with lighting systems, chemical manufacturing reactors or electrochemical cells, such as fuel cells.

Although their processes and chemical reactants are somewhat different, they have similar structures and features—including a capability of having $H_2$ withdrawn simultaneously and rapidly with the chemical reforming reaction.

This invention uses Taylor Vortex Flows ("TVF"—also known as Taylor—Couette Flows) in fuel reformers to achieve enhanced reaction rates and product extraction efficiencies by a) accelerating mass transport of reactants at catalyst surfaces, b) simultaneously and rapidly removing target reaction products from the reaction, c) preventing strong carbon adhesion to catalyst surfaces, d) capturing reaction contaminants that can degrade both catalyst and filtering surfaces and e) eliminating those degrading reaction products from the reformers.

TVF occurs when a viscid fluid (e.g. fuel) is confined in a gap between two cylinders where one cylinder is rotating with respect to the other. A viscid fluid is a viscous fluid that is capable of adhering or wetting an electrode or catalyst surface. A viscous fluid that cannot adhere or wet a surface is called an inviscid fluid. This invention focuses on viscid fuels and electrolytes because these will generate TVF.

For low differential angular velocities, in terms of circumferential Reynolds number, $R_c$, the viscid flow is steady, purely azimuthal and known as Circular Couette Flow. Catalytic surfaces described here use TVF that automatically generate accelerated, stable laminar flows of viscid fluids at the catalyst and the filtering surfaces. These laminar flows increase the rate of $H_2$ generation in gaseous fuel/catalyst reactions and facilitate removal of the $H_2$ through filter media. Catalytic materials that present high surface area/projected area ratios to reactive chemicals are described in Case C.

TVF was first described by Sir Geoffrey Ingram Taylor in his seminal paper *Stability of a Viscous Liquid contained between Two Rotating Cylinders*, Phil. Trans. R. Soc. London (8 Feb. 1923), Vol. 223—A 612, pp. 289-343. It was a groundbreaking paper on stability of the Couette flow. He reported that when the differential velocity, between the opposing cylinder surfaces forming a gap, is increased to a range within observed minimum and maximum speeds, Couette flow becomes unstable. Then, a secondary steady-state is created that is characterized by contra-rotating, axisymmetric, toroidal vortices with unique properties. This secondary steady-state is known as TVF.

Mechanical systems generating TVF are well known in the prior art of particulate filtration. For example, the following U.S. patents, hereby incorporated herein by reference, describe systems employing TVF for filtering blood without clogging a plasmapheresis membrane filter:

| # | Date | Title | Inventor |
|---|------|-------|----------|
| 4,755,300 | July 1988 | Couette Membrane Filtration Apparatus . . . | Fischel, R et al. |
| 4,808,307 | February 1989 | Couette Membrane Filtration Apparatus . . . | Fischel, R et al |
| 4,919,817 | April 1990 | Blood Cell Washing Systems & Method | Schoendorfer et al |
| 5,034,135 | July 1991 | Blood Fractionation System & Method | Fischel, H. |
| 5,053,121 | October 1991 | Blood Cell Washing System & Methods | Schoendorfer et al |
| 5,194,145 | March 1993 | Method . . . For Separation of Matter . . . | Schoendorfer |
| 5,376,263 | December 1994 | Pump Control Apparatus . . . Rotating . . . | Fischel, H. |
| 5,464,534 | November 1995 | Blood Fractionation System & Method | Fischel, H. |
| 5,738,792 | April 1998 | Method For Separation of Matter . . . | Schoendorfer |
| 5,783,085 | July 1998 | Blood Fractionation Method | Fischel, H. |

Particulate filters are readily distinguished from fuel reformers because the filters 1) lack catalysts and 2) do not promote chemical reactions.

In particulate filters such as these blood filters, a fluid, such as blood, containing a suspended particulate, such as blood cells, is pumped through a gap between opposing cylinder walls. One wall, usually the outer, is solid while the other is porous. The porous wall usually incorporates filter media and rotates within the outer wall. Fluid penetrates the filter media on the inner wall where TVF-accelerated laminar shear prevents particulates from entering and clogging the filter media pores. TVF trap the particulates and transport them to an exit from the gap to be purged from the system.

Fuel reformers of this invention comprise different structures and employ TVF in a manner different from mechanical filters. For example, fuel reformers incorporate porous catalysts that must not be used as filters because contaminants will degrade catalytic efficiency. Only inert make-up gas that compensates for the extracted hydrogen to maintain system pressure and oxygen just sufficient to oxidize molecular carbon attached to the catalyst surfaces passes through the porous catalysts. Unconverted fuel, contaminants and especially carbon particles from pyrolysis are trapped by TVF and purged from the reformer.

TVF also generate high-shear-rates laminar flows, called Circular Couette Flows (CCF), at catalytic surfaces that promote $H_2$ production. The controlling factor for laminar shear rates is the minimum value of the hydro-dynamically defined Taylor number, $T_c$ above which desirable energetic vortices are fully established. Axial Poiseuille-type flow is induced by injection of fuel and recirculation of make-up gas. Also, there is a strong dependence of the critical $T_c$ on the strength of axial flow, which is related to its characteristic Reynolds number, $R_a$.

Furthermore, there is a requirement to maintain laminar flow at catalyst surfaces while promoting TVF within the fuel. Care must be taken to restrict the circumferential Reynolds number, $R_c$, to non-turbulent values. A set of distinct variables define a particular range of permissible operating parameters. These variables include predetermined ranges of: 1) temperature and pressure of gaseous fuels, 2) kinematic viscosity and density of the fluids being employed, 3) their respective rates of recirculation, 4) angular rotation speed, 5) surface characteristics of the electrodes or catalyst surfaces and, 6) physical dimensions of the cell.

The present invention is a robust fuel reformer in which fuel passes between relatively rotating, cylindrical surfaces that cause Taylor Vortex Flows (TVF) and Circular Couette Flows (CCF) within the fuel. TVF facilitates removal of contaminants that could damage the reformers or fuel cells and chemical reactors that use hydrogen produced by the reformers.

It is therefore a first object this invention to provide a robust fuel reformer and method for converting a hydrogen-containing fuel into separable $H_2$ through the use of TVF that capture and eliminate reaction byproducts and contaminants.

A second object of this invention is to provide high-shear-rate CCF at catalyst surfaces to promote increased reformer reaction rates.

A third object of this invention is to provide criteria for pumping fuel and inert make-up gas to maintain system pressure, into and reaction products out of a fuel reformer at a rate that will optimize creation of Taylor Vortex Flows in the fuel.

A fourth object of this invention is to provide structure for a fuel reformer that will optimize its performance for extracting $H_2$ from a fuel and separating $H_2$ for removal and further use.

A fifth object of this invention is to provide fuel reformers that create dynamic flows within all fluid constituents to induce exceptionally high rates of mass transport to and from catalytic members.

A sixth object of this invention is to provide oxygen with the make-up gas as may be required to keep catalyst surfaces free of adsorbed carbon.

These and other objects of this invention are more fully set forth in the following description of a preferred embodiment of this invention.

BRIEF DESCRIPTIONS OF THE SEVERAL VIEWS OF THE DRAWINGS

FIG. 2A, FIG. 2B, FIG. 2C and FIG. 2D are more detailed illustrations of TVF in a fuel cell or a fuel reformer.

DETAILED DESCRIPTION OF THE INVENTION

Figure 1A:
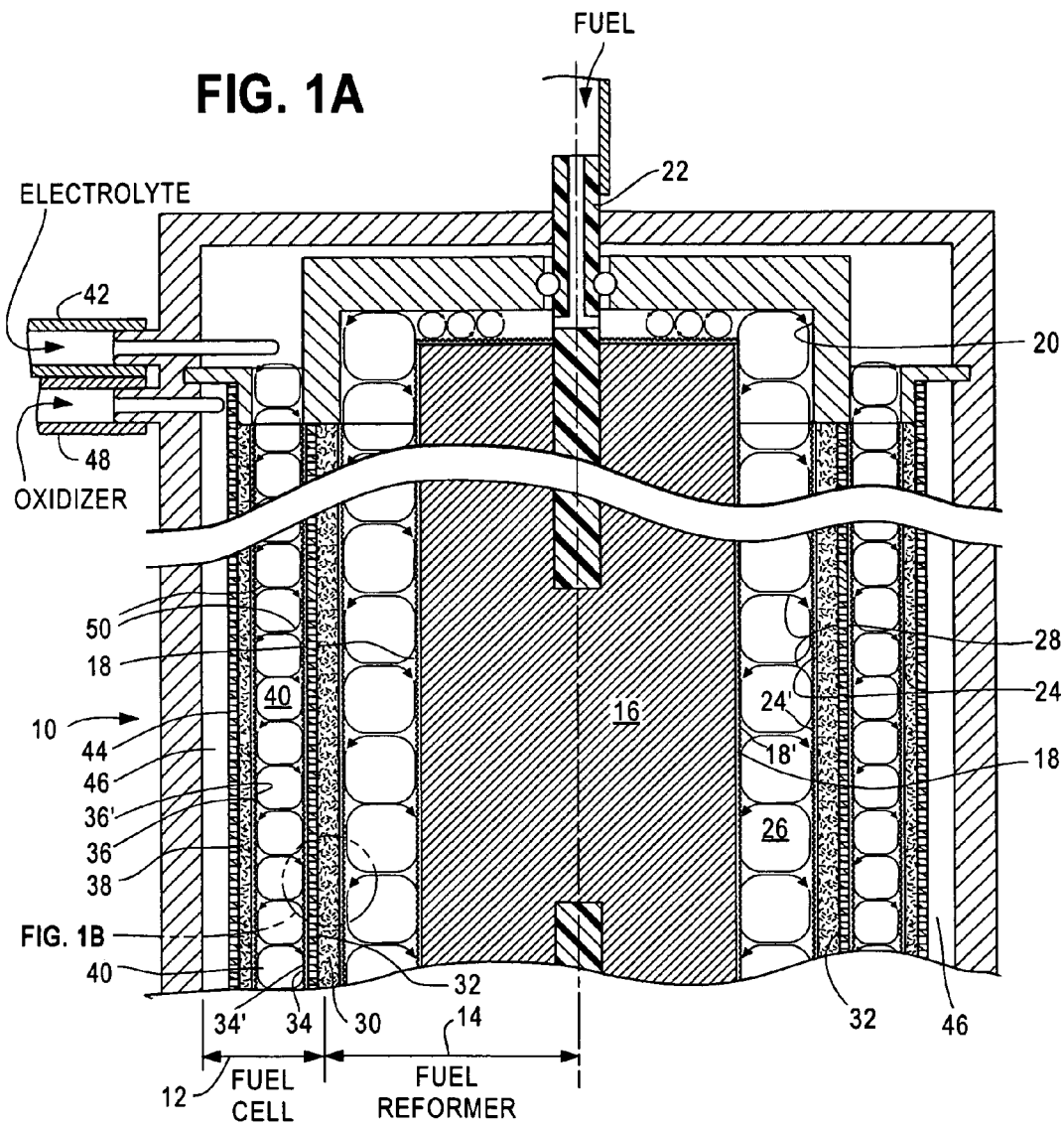
FIG. 1A is a fragmentary, cross-sectional view of a preferred embodiment of a TVF electrochemical fuel cell incorporating a direct internal reformer (DIR) for production of $H_2$ for use by the fuel cell.

FIG. 1A is a cross-sectional view of essential features of a preferred embodiment of an electrochemical cell 10 of this invention, as taught in Case A, cited above. The electrochemical cell 10 is configured as a combination fuel cell 12 and fuel reformer 14 that performs direct internal reforming (DIR).

The reformer 14 portion extracts $H_2$ gas from fuels, such as methane mixed with steam. The $H_2$ gas is subsequently used for powering the fuel cell 12 portion that converts $H_2$ and $O_2$ gases into electrical energy and water. Extraction of $H_2$ in such an electrochemical cell 10 is known as direct internal reforming of fuel.

Reformer 14 comprises a fixed cylinder 16 having a porous reformer inner catalytic shell 18 on its impervious outer wall. Cylinder 16 is fixed to the frame of cell 10 by means not shown. Cylinder 16 may contain a heater (not shown) for providing thermal energy to the reformer's 14 endothermic fuel reforming chemical reaction. More commonly, heat is provided by the exothermic reaction of the fuel cell 12.

Cylinder 16 is located within a reformer/fuel cell hollow cylinder 20 that rotates around fuel input tube 22. The inner wall of cylinder 20 has a porous reformer outer catalytic shell 24. Reformer catalytic shells 18 and 24 have surface layers 18' and 24' that define a reformer chamber 26 that is in fluid communication with fuel input tube 22.

Figure 1B:
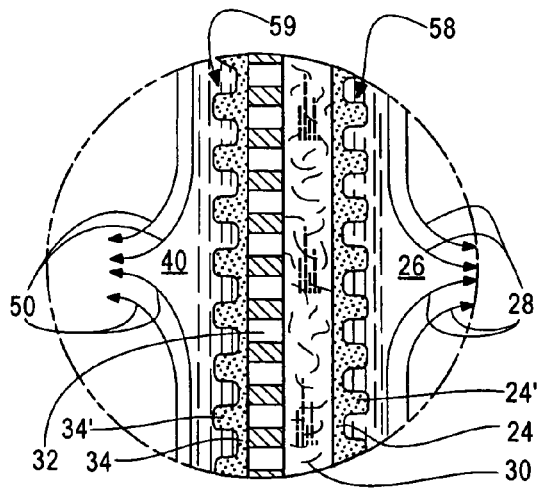
FIG. 1B is a magnified view of a portion of FIG. 1A showing a portion of the fuel cell's cathode electrode.

The reformer 14 is activated by pumping a fuel (from a source not shown), such as a mixture of gaseous methane and steam, through the fuel input tube 22 and causing the cylinder 20 to rotate at a speed sufficient to generate TVF 28 in the reformer chamber 26—as shown in FIG. 1A and FIG. 1B. Reforming will generate $H_2$, which will penetrate the reformer outer catalytic shell 24 while $CO_2$ may be carried out of the reformer chamber 26 through a vent that is not shown or allowed to pass through shell 24. Other fuels (e.g. methane, methanol, ethanol and sodium borohydride ($\alpha NaBH_4$)) that can be reformed to extract hydrogen may also be used.

$H_2$ that penetrates the reformer outer catalytic shell 24 continues through reformer rotational cylinder porous wall 30 and into fuel cell 12. The $H_2$, which is a reducing agent or reductant, enters the fuel cell 12 by penetrating through an inner or first hydrogen-porous metal surface 32, which can be $H_2$-selective palladium, and then into porous anode electrode 34. Multiple catalyst particles embedded within the pores of electrode outer or second surface layer 34', as disclosed in Case C and Case D, then react with the $H_2$ entering its pores to produce $H^+$ ions at the electrode's surface layer 34'. The porous metal surface 32 both supports electrode 34 and conducts heavy electrical currents from it. Means for connecting the inner porous metal surface 32 and the anode electrode 34 to an external electrical circuit (e.g. a slip ring or rotary electrical interface) are not shown.

The fuel cell electrode 34 is within fuel cell 12 porous cathode electrode 36 that is secured to the inner wall of fixed porous cylinder 38, which cannot rotate. A fuel cell fluid electrolyte chamber 40 is defined by space between the fuel cell's anode electrode 34 and cathode electrode 36 that, in this embodiment, has substantially parallel surface layers 34' and 36' that are separated to permit anode electrode 34 to rotate within cathode electrode 36. The surface layer 36' is the cathode electrode's 36 inner surface layer, is porous and contains catalyst. The electrolyte chamber 40 is in fluid communication with electrolyte input tube 42 that can be connected to a source (not shown) of electrolyte. Means for draining contents of any unreacted hydrogen or oxygen gas in the electrolyte chamber 40 are not shown. The cathode electrode 36 has an outer or first porous metal surface 44 that supports the cathode electrode 36 and conducts heavy electrical currents from it. Means for connecting the cathode electrode 36 to an external electrical circuit also are not shown.

Reformer 14 cylinders 16 and 20 and fuel cell 12 electrodes 34 and 36 are shown in the drawings as right-circular and coaxial; however, these attributes are not a requirement and other cylinder-like geometries (e.g. elliptical, conical, hyperbolic, irregular, different axes) may be employed so long as the surfaces do not come in contact. Also, it is practical to build a cell where the inner cylinder is fixed and the outer cylinder rotates or both cylinders rotate at different speeds or directions. All that is required is that one of the cylinders rotates relative to the other so that there is a rotational speed difference between the cylinders.

Generally, electrodes 34 and 36 and catalytic fuel reforming shells 18 and 24 are coextensive, both circumferentially and axially. The gaps between facing surfaces in chambers 26 and 40 may vary somewhat by imparting a slightly cylindrical-conical shape, not shown, to either or both surfaces in order to establish a uniform pressure in axially flowing fluid contained within these chambers 26 and 40.

The outer or first porous metal surface 44 of the fuel cell porous cylinder 38 is in fluid communication with oxidizer manifold 46. The oxidizer manifold is connected to oxidizer input tube 48 that can be connected to an oxidizer source (not shown). Preferred oxidizers include purified, $O_2$, air or a liquid such as hydrogen peroxide, depending on choice of fuel. The oxidizer penetrates through an outer or first porous metal surface 44 and then into porous anode electrode 36. Multiple catalyst particles embedded within the pores of electrode 36, disclosed in Case C and Case D, then react with the oxidizer entering its pores to produce OH ions at the electrode's inner or second surface layer 36'.

The outer or first porous metal surface 44 of the fuel cell porous cylinder 38 is in fluid communication with oxidizer manifold 46. The oxidizer manifold is connected to oxidizer input tube 48 that can be connected to a source (not shown) of $O_2$. Preferred oxidizers include purified air or a liquid such as hydrogen peroxide, depending on choice of fuel. The oxidizer penetrates through an outer or first porous metal surface 44 and then into porous anode electrode 36. Multiple catalyst particles embedded within the pores of the electrode 36, disclosed in Case C and Case D then react with the oxidizer entering its pores to produce $O^{=}$ ions at the electrode's inner or second surface 36'.

The electrochemical cell 10 is operated to produce electricity for transmission to an external load (not shown) by a process comprising:

1. Pumping a reformable chemical, such as hydrocarbon fuel and steam, through fuel input tube 22 into reformer chamber 26;
2. Pumping electrolyte through electrolyte input tube 42 into electrolyte chamber 40;
3. Pumping oxidizer, such as—but not limited to, $O_2$, hydrogen peroxide, air or $O_2$ extracted from air, through oxidizer input tube 48 into oxidizer manifold 46 and through the catalyzed reaction zone of electrode 36 so that the oxygen component is largely converted to $O^{=}$ or $OH^-$ ions that a) can enter electrolyte chamber 40 or b) either one of these ions can combine with $H^+$ ions to form water that can enter electrolyte chamber 40;
4. Rotating reformer hollow cylinder 20 at a rate sufficient to cause—
   i. fuel reformer Taylor Vortex Flows 28 in reformer chamber 26,
   ii. fuel cell 12 Taylor Vortex Flows 50 in the fuel cell electrolyte chamber 40, and
   iii. $H_2$ from the fuel, and any $CO_2$ produced by the reforming process not otherwise purged from reformer chamber 26, to pass through the catalyzed reaction zone of electrode 34 with sufficient residence time to produce $H^+$ ions from essentially all the reformed $H_2$ fuel so that the $H^+$ ions either pass into the electrolyte chamber 40 or combine with $OH^-$ ions to form water;
5. Venting any residual $CO_2$ and unreformed fuel from the reformer chamber 26; and
6. Draining electrolyte containing $H_2O$ and any $CO_2$ gas created by the reformer's 14 and fuel cell's 12 chemical reactions, as well as any unreacted gas passing through electrode 36, from the electrolyte chamber 40.

Creation of the TVF 28 in the fuel reformer chamber 26 provides three significant operational advantages, namely:

Creation of exceptionally high-shear-rate laminar CCF at the reformer's fixed inner catalytic shell 18 and rotating outer catalytic shell 24 to facilitate chemical reaction mass transport to promote faster chemical reactions;

Withdrawal of $H_2$ simultaneously with the chemical reaction to permit the reaction to run to completion without any need to provide addition reactions for intermediate products; and Elimination of reaction byproducts (e.g. water, CO, $CO_2$ carbon dust and soot) with fuel and/or electrolyte circulation.

These three principal advantages translate into higher $H_2$ generation in terms of both size and weight over prior art fuel reformers.

In every case, in accordance with the invention, fuel and electrolyte, whether or not recirculated for reuse, are contained within a chamber, 26 or 40, having at least one facing rotating surface. Rotation of the rotating cylinder 20 imparts energetic, but non-turbulent Taylor Vortex Flows 28 or 50 in the fuel or electrolyte immediately upon entry of the fluid into its respective chamber 26 or 40.

The active electrodes 34 and 36 and the catalytic shells 18 and 24 have a particularly novel structure, to be described in conjunction with Case C and Case D. These structures contribute to a 4-fold amplification of effective electrode area and are configured to facilitate laminar flows in adjacent fluids (fuel or electrolyte).

Figure 2A:
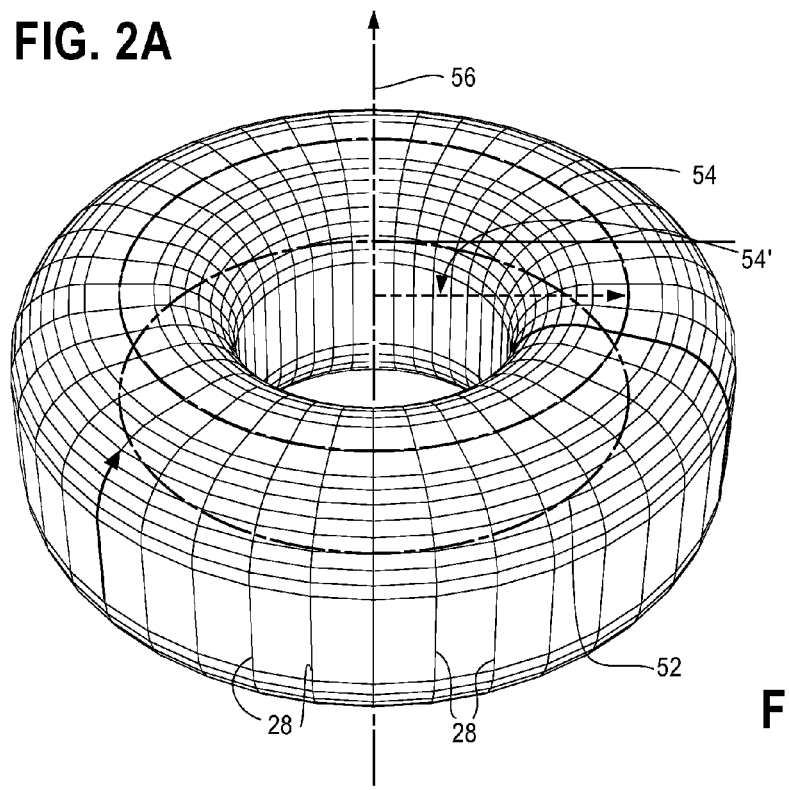
Figure 2B:
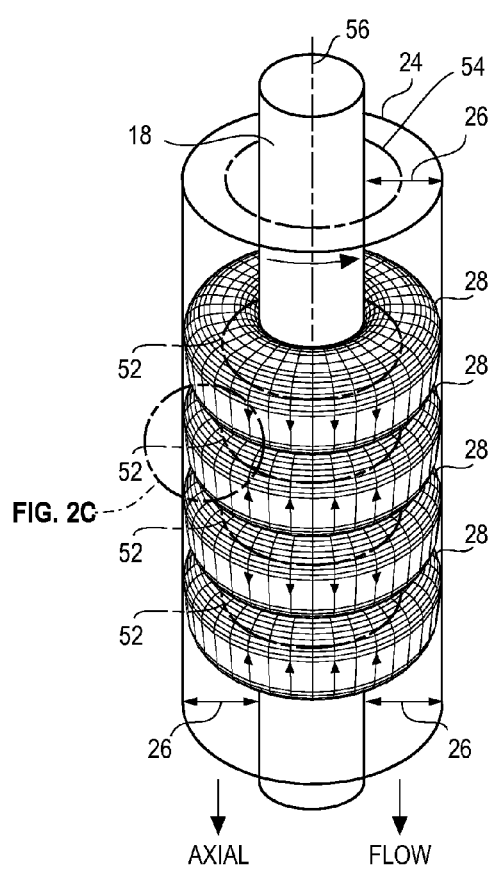

FIG. 2A, FIG. 2B and FIG. 2C are more detailed and somewhat idealized illustrations of Taylor Vortex Flows (TVF) between one set of facing active surfaces—such as reformer 14 shells 18 and 24.

Figure 2D:
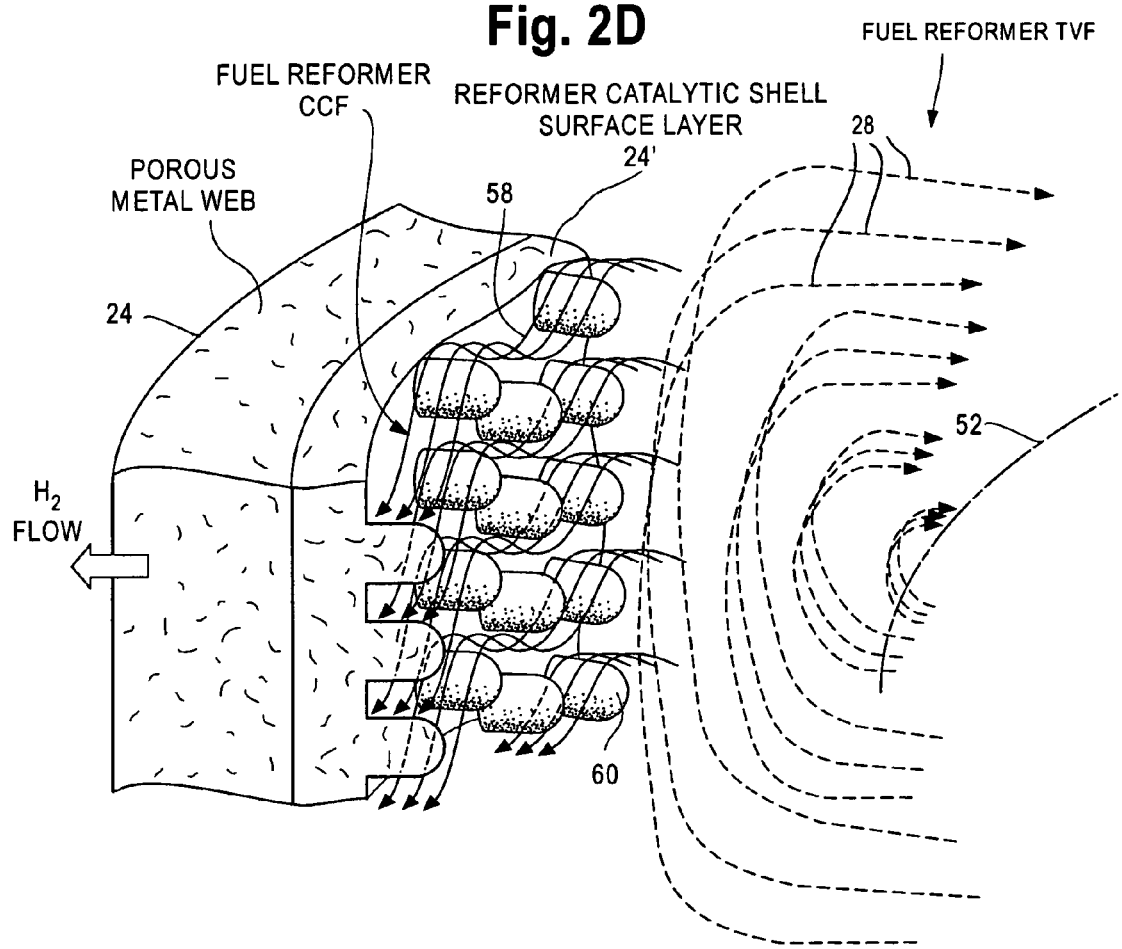

The vortex flows 28 resemble doughnuts or, more technically, tori of fluid that rotate around their own axes 52. These tori spin axes 52 define planes that are perpendicular to the cross-section view plane of FIG. 2C. FIG. 2D shows a torus 28 spin axis 52 in perspective. The vortex radii 54' extend from the cell's spin axis 56 to the center 54 of reformer chamber 26 between the respective stationary and rotating shells 18 and 24.

As shown in FIG. 2B, several vortices 28 form an array that extends along the full axial length of the reformer chamber 26. Each vortex 28 is contra-rotating with respect to its neighbor vortex 28. Diameters of vortexes 28 are slightly less than the width of the reformer chamber 26 in order to accommodate high-shear-rate laminar CCF 58, shown in FIG. 2C and FIG. 2D, which surround the TVF 28 and are adjacent to the shells 18 and 24. FIG. 1B also illustrates the CCF 58 in the reformer chamber 26 and CCF 59 in the fuel cell electrolyte chamber 40.

Of critical importance to the invention is the fact that the entire array of vortices 28 is enveloped by the high-shear-rate laminar boundary layer 58 (FIG. 1B, FIG. 2C and FIG. 2D) of spinning fluid almost fully covering each adjacent surface that encloses the array of vortices 28. Thin layers of fluid are moving with high laminar shear perpendicularly to the sectional plane of FIG. 2C. FIG. 2D provides a perspective view of the relationship between the CCF 58 and the TVF 28 rotating around the TVF axis 52. The CCF 58 are orthogonal to the TVF 28 and parallel to the TVF axis 52. The CCF 58 encompass protuberances 60 (FIG. 2D) that extend from the reformer rotating outer catalytic shell 24 surface layer 24' into the CCF 58. A similar relationship is formed at the concave cylindrical shell surface layer 18 (not shown in FIG. 2D).

Referring to FIG. 2C, the CCF 58 adjacent the rotating shell surface layer 24' move most rapidly near the catalytic surface layer 24' and least rapidly where CCF 58 transition to TVF 28 at 62, which is a small distance from surface layer 24'. Conversely, the CCF 58 are nearly static adjacent the stationary shell layer 18' and move most rapidly where the CCF transition to TVF 28 at 64, which is a small distance from the surface layer 18'.

The high velocity differences of these laminar boundary layer CCF 58 and the very small distances over which they occur produce extremely high shear rates and consequently large mass transport coefficients. The invention takes further advantage of this very desirable condition by incorporating active catalytic surfaces 18' and 24' with protrusions 60 of catalytically-active material that extend into the high-shear laminar-flow streams 58 shown in FIG. 2C and FIG. 2D and disclosed in Case C and Case D. This greatly increases the amount of catalytic surface exposed to the high shear flow.

An important feature of the TVF 28 is illustrated in FIG. 2C where particles 66 from a precipitate, including water attached to the precipitate (e.g. $NaBO_2$) and bubbles from either surface layer 18' or 24' produced during fuel reforming into reformer chamber 26 are drawn into the centers of vortices 28. The particles and bubbles 66 are not in actual solution as part of the fuel and are therefore subject to the flow dynamics just described. They will experience high pressure gradients caused by the fluid electrolyte TVF 28. These high gradients appear in both the high-shear laminar CCF 58 and within the vortices 28. They quickly drive the particles and bubbles 66 to the centers of the nearest vortices 28 where they remain trapped.

Vortices 28 move in axial flow through the electrolyte chamber 26. The particles and bubbles 66 trapped within vortices 28 are forced out of the reformer 14 along with their host vortex 28. Thus, TVF 28 constitute means for extracting unwanted contaminants 66 from the fuel. These unwanted contaminants 66 may include reaction precipitates, water vapor, $CO_2$ and any gasses that can degrade the fuel.

Details of preferred catalytic surface layers (e.g. 18' and 24') surface structures are provided in Case C and Case D. Protuberances (e.g. 60 on the surface layers 18' and 24' as shown in FIG. 1B, FIG. 2C and FIG. 2D) should reach about half, to at most three-quarters, of the way into the laminar shear layer; but, not into the vortices 28 where they would be subjected to excessive viscous drag and consequent material deterioration or disruption of TVF. That layer does not exceed 0.005 cm. Therefore, the protuberances 60 should have a net height of about 0.00251 cm.

A plane geometric calculation shows that if ř is the radius of an idealized cylindrical shaped protuberance; then locating the protuberances 60 on the electrode surface layer 36' in a typical hexagonal array on centers spaced approximately 2.5ř apart will cover approximately one-half the surface layers 18', 24' area with the protuberances 60. This is explained in greater detail below and in Case C and Case D.

If the height of the cylindrical portion is 2ř to 4ř and is capped by a hemispherical dome, then the total external surface area of the projection is in the range of 6 to 10 $\pi ř^2$. Because the area of the portion of surface covered by the projection is $\pi ř^2$, the area multiplier for half the area is simply 6 to 10 and the net area multipliers are 3.5 to 5.5 for an average projected area of 4.5 times the face area.

With a net height of about 4 times the radius or 0.0025 cm, the protuberances 60 have diameters of about 12.5 µm and are spaced on centers 15.625 gm apart. The electrode 36 surface will have an appearance and feel of 1000 to 1500 grit abrasive paper of a type used to polish stone.

Figure 2E:
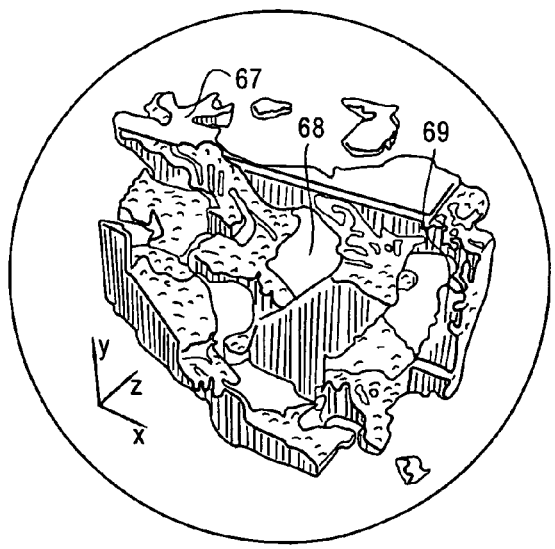
FIG. 2E is a computer-simulated view of a catalytic surface.

FIG. 2E is a drawing made from a computer-simulated view of a catalytic surface layer (e.g. 18', 24') fabricated from nanoporous metal foam or scaffold 67. The view appeared as FIG. 4 of Pugh et al, "Formation of nanoporous platinum by selective dissolution of Cu from $Cu_{0.75}Pt_{0.25}$", J. Material Research, Vol. 18, No. 1, Jan. 2003, pages 216-221. Coordinate vectors x, y, z are provided as a reference frame. The view covers a volume measuring 14×14×7 nm. Pugh et al used 0.28 nm pixel spacing in calculating their image, which is the atomic radius of a Pt atom.

Pugh et al were able to produce isotropic 3-dimensional open-pore-structure foam with 3.4 nm pores 68 surrounded by smaller diameter scaffold struts 69 (called "ligaments" by Pugh et al). Pugh et al estimated sizes by "taking chord length measurements on the image".

Using the metal alloy face-centered-cubic structural geometry described by Pugh et al and by others (e.g., Erlebacher, J., "An Atomistic Description of Dealloying—Porosity Evolution, the Critical Potential and Rate-Limiting Behavior", J. Electrochemical Society, Vol. 151, No. 10, 2004, pages C614-C626); the approximate relationship of open pore fraction, $\rho_v$, to the chord length, $l_c$ and diameter, D in Pugh et al is given by:

$$(1-\rho_v)=(0.75\pi x^2+x^3)/(1+x)^3$$

where:
  $x=D/l_c$, and
  $(D+l_c)$—nominal pore size

The higher power term cannot be ignored when D is a substantial fraction of $l_c$. The stated pore volume fraction is 0.75 based upon a starting Pt alloy concentration of 25% so that the chord diameter would calculate to approximately 2.0 nm for the smallest pore. The $D/l_c$ ratio is 0.58, which is a function of foam sponge geometry and pore volume fraction; but, does not vary for larger pore size results reported by Pugh et al. These dimensions can be increased by varying process parameters, such as de-alloying times, temperatures, applied voltages, solvents and alloy compositions.

The metal foam or scaffold 67 of FIG. 2E is open and permeable in 3-dimensions and contains pores 68 of 5 to 15 nm contained by the scaffold struts 69, which have smaller dimensions. Metal or metal alloy or organic catalyst particles (not shown) decorate the scaffold struts 69. The catalyst particles are of about 2 to 7 nm in size for best surface area dispersion and catalyst activity. For fuel reformers 14, one or more metals selected from the Periodic Table of the Elements Platinum Metals Group (e.g. Pt, Ru) or Periodic Table of the Elements Group 10 (e.g. Ni) and their alloys are preferred catalyst materials for the particles and the foam scaffold 67.

Figure 4:
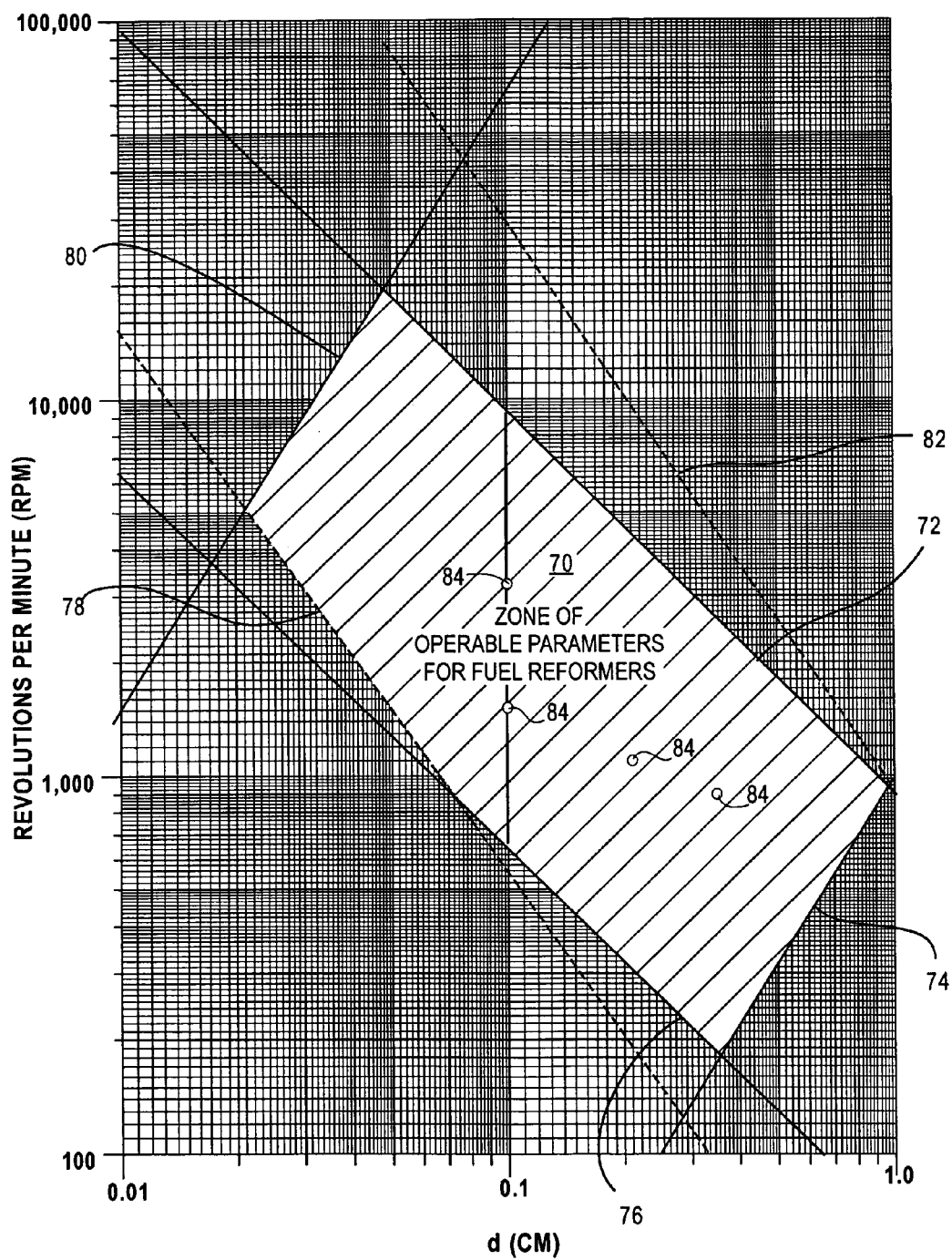
FIG. 4 is a log-log graph of Revolutions Per Minute (RPM) as a function of gap width, d, for a range or zone of operable conditions in an electrochemical fuel cell.

Pugh et al described their metal foam pictured in their FIG. 4 as an open pore structure having 3.4 nm or larger pores 68 and comprising comparably sized Pt struts 69. Using x=0.58 and D=2 nm as calculated above, the ratio of exposed active catalyst area to projected surface area is:

$$[3\pi x/(1+x)^2](T/P_D)$$

where:
  $P_D=(D+l_c)$=nominal pore 68 diameter,
  T=depth thickness of the fuel flow permeating surface layers 18', 24', and
  D=diameter of the nanostruts 69 forming the pores 68.

In a 100 micron thick surface layers 18', 24' having 75% open pore volume, 3.4 nm pores 68 and 2.0 nm diameter struts 69, the area multiplication factor is 41,000 $cm^2$ of exposed reactive surface area per $cm^2$ of projected surface layers 18', 24'.

By comparison, the formula for an equivalent packing volume of spherical particles is $6(1-\rho_v)(T/D)$. Thus, the Pugh et al foam 67 has an exposed surface area comparable to spherical particles with equivalent Pt volume loading. While supported particles normally lose about half of their exposed area because of attachment requirements, the porous foam struts 69 are fully exposed to reaction kinetics. Consequently, bare nanoporous foam 67 is at least as effective as a catalyst dispersion mechanism as supported particles of equivalent dimension; but, is a more stable structure.

Metal foam 67, with an open pore volume of 75%, is more effective for the mass transport exposure of catalyst to TVF and CCF than supported catalyst particles. Even with pore 68 diameters of 25 nm, the active catalyst area ratio for a 100 micron thick catalyst layer is an unprecedented 8,750 $cm^2$ to 1 $cm^2$ of projected surface layer 18', 24' area.

For reformer surface layers 18' and 24', the Pt nanoporous metal foam 67 can be loaded with Ru particles made from a colloidal suspension of the appropriate salts as taught in the prior art. The foam 67, containing Ru particles, can be heat-treated so that the particles are absorbed into the Pt struts 69 to form a foam of 50:50 Pt—Ru alloy. Alternatively, a 5 to 15 nm Pt porous foam 67 with 50:50 Pt—Ru particles of 2 to 5 nm size can be thermally attached by heat sputtering to the struts 69. Pure Pt will work for oxygen cathodes.

These catalyst surface layers 18', 24' of nanoporous foam or scaffolds 67 can be deposited on or secured to microporous copper substrates that will provide substantial strength for the catalyst surface layers 18', 24'. The copper substrates may be easily coated with a high-molecular-weight compound, such as a polymer (e.g. PTFE), to protect the copper from corrosive attack by or premature hydrolysis of some fuels (e.g. borohydrides) and to keep the fuel from penetrating past the surface layers 18', 24'.

The surface layers 18', 24' comprising catalytic metal foam 67 can be operated safely at elevated temperatures in the range of 250 to 350° C. and at elevated pressures to achieve accelerated catalytic performance. The same structure and process can be used to build nanoporous catalytic layers from other metal foams 90, such as gold, copper, tungsten and nickel.

The catalyst particles need a fluid or an electrolyte to wet, but not flood, them in a thin envelope of fuel that will react at the catalyst surfaces. For fuel reformers, the boundary layer thicknesses for typical design parameters are about 0.05 mm.

Figure 3:
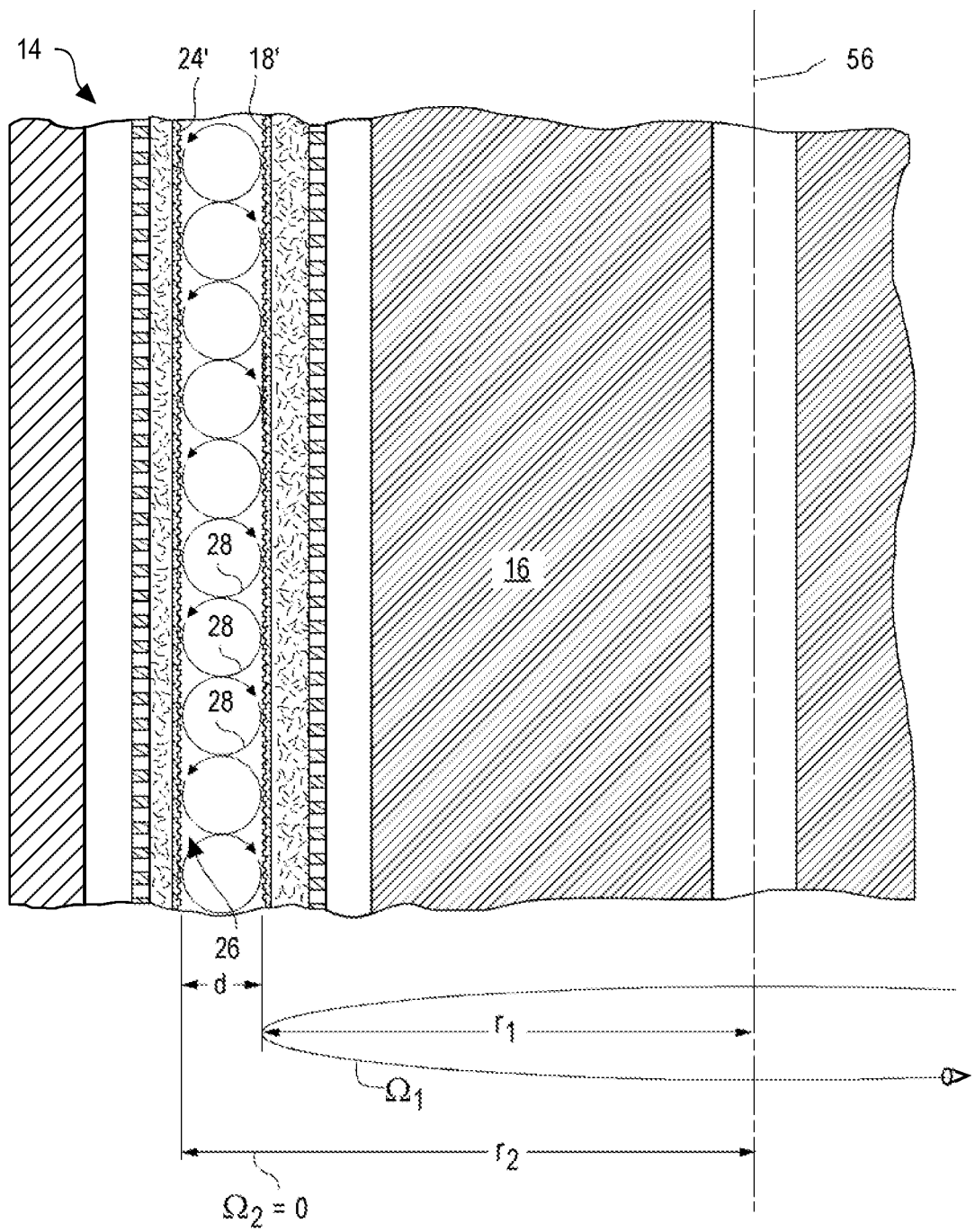
FIG. 3 is a cross-sectional view of a portion of the direct internal reformer fuel chamber having Taylor Vortex Flows in the fuel.

FIG. 3 is a cross-sectional view of a portion of fuel reformer 14 chamber 26 having Taylor Vortex Flows 28 in a fuel. One side of the chamber 26 is a cylindrical (or slightly conical) first porous surface layer 18', that may or may not have catalytically active surface, at radial distance, $r_1$ from cell spin axis of rotation 56 about which first porous surface layer 18' is caused to rotate at an angular rate, $\Omega_1$. The other side of the chamber 26 is a cylindrical (or slightly conical) second porous surface layer 24' that also may or may not have catalytically active surface, at radial distance, $r_2$ from cell spin axis of rotation 56. A gap of thickness, $d=r_2-r_1>0$ is defined between the two surface layers 18' and 24'. As used herein, the term 'gap' is synonymous with the width of the fuel reformer 14 chamber 26.

As derived from Lathrop, Daniel P., et al, "Transition to shear-driven turbulence in Couette-Taylor flow.", Physical Review A, vol: 46, No. 10, (Nov. 15, 1992), pp; 6390-6404, the circumferential Reynolds number, $R_c$, for fluids contained in a gap between a moving member having rotational speed $\Omega_1>0$ and a fixed member having speed $\Omega_2=0$ is defined as:

$$R_c = \{\pi(RPM)r_1 d/30v\} \leq 10^4 \qquad \text{Equation \& Condition (1)}$$

where:

$\Omega_1 = [2\pi(RPM)/60]$ radians/second; and $v$=kinematic viscosity=$\mu$(poise)/p(grams/cc.)

The condition that $R_c \leq 10^4$ is required for well-formed Taylor Vortex Flows so that fluid flow contained within the gap d be non-turbulent. The condition that these vortices exist in a form required by the invention can be written as the following lower limit for the critical Taylor number, $T_c$ at which the characteristic vortices begin to form:

$$T_c = 2r_1(\pi/30)^2 d^3 (RPM)^2/v^2 (2+\{d/r_1\}) \geq 1,715 \, (f\{R_a\}) \qquad \text{Equation \& Condition (2)}$$

where:

$f\{R_a\}$ is a function derived in Chandrasekhar, S., "The hydrodynamic stability of viscid flow between coaxial cylinders", Proc. Nat. Acad. Sci., vol: 46, No. 1, (1960) pp. 141-3 and reported to be experimentally verified in R. J. Donnelly and D. Fultz, "Experiments On The Stability Of Spiral Flow Between Rotating Cylinders", ibid. No. 8, pp; 1150-1154 [see their FIG. 1 on page 115]; and $R_a$=the axial Reynolds number for Poiseuille-type axial recirculation flow through the gap, d.

A convenient way to express $R_a$ is:

$$R_a = (dL/v)(\dot{U}/U) \qquad \text{Equation (3)}$$

where:

L is the axial length of the active porous member(s),

U is the volume of fluid in the gap of thickness, d, $\dot{U}$ is the volumetric rate of axial flow from one end of the gap to the other, and $\dot{U}/U$ is the rate of exchange of all the volume in the gap.

A convenient numerical expression for $f\{R_a\}$ is:

$$f\{R_a\} = 1.0 + (0.297)(\log_{10} R_a)^{4.04342} \text{ for } R_a > 1.0$$

$$f\{R_a\} = 1.0 \text{ for } 0 \leq R_a \leq 1.0$$

The two Conditions, (1) and (2), defined above should be met for optimum operation. They do not restrict design parameters to specific values; but rather, permit a fairly broad range of permitted values that can be chosen to satisfy other desirable conditions.

For example, it may be desirable to limit torque driving the rotating member so that it does not consume an appreciable fraction of the power generated. The thickness of the laminar high shear boundary layer on the facing surfaces of each of the porous members can be chosen for optimal mass transport characteristics. The equations that define these properties are:

Torque, T was defined in Lathrop, Daniel P. et al, "Transition to shear-driven turbulence in Couette-Taylor flow.", Physical Review A, vol: 46, No. 10, (15 Nov. 1992), pp; 6390-6404 as:

$$T = (0.202)\rho v^2 L (r_1 R_c/d)^{5/3} \text{ dyne-cm} \qquad \text{Equation (4)}$$

Therefore, the power expended in rotating the inner member per $cm^2$ of surface area is:

$$W = (7.834)\rho v^{1/3}(r_1)^{7/3}(RPM)^{8/3} \times 10^{-12} \text{ Watts/cm}^2 \qquad \text{Equation (5)}$$

The respective stable boundary layer thickness in cgs units, $\delta_1$ and $\delta_2$ is:

$$\delta_1 = (28.45)(v/RPM)^{2/3}(r_1)^{-1/3} \text{ cm} \qquad \text{Equation (6a)}$$

$$\delta_2 = (1.29)(1+[d/r_1])\delta_1 \text{ cm} \qquad \text{Equation (6b)}$$

Neither the power expended, W, nor the boundary layer thicknesses, $\delta_1$ nor $\delta_2$, depend on the gap dimension, d, between the two porous surfaces. $\delta_2$ is a function of $r_2$. The nominal shear rate without TVF would be $\Omega_1 r_1/d$; but, the shear rate with TVF, for $\Omega_1=0$, is $\Omega_1 r_1/\delta_1$ and $\Omega_1 r_2/\delta_2$ for the two surfaces, respectively.

Thus, shear at each surface is multiplied by factors of:

$$d/\delta_1 = 0.03515(v/RPM)^{-2/3}(r_1)^{1/3} d; \text{ and}$$

$$d/\delta_2 = 0.775(d/\delta_1)/(1+d/r_1).$$

If d is small compared to $r_1$, then stable laminar shear at the outer stationary surface is only slightly less than at the rotating one.

FIG. 4 is a log-log graph of Revolutions Per Minute (RPM) as a function of gap width, d, for various operating conditions of an electrochemical fuel cell. A Zone of Operable Parameters 70 is bounded by the following six conditions for $0.0067 \leq d/r_1 \leq 1.0$ shown as plot lines:

72-$R_c \leq 10^4$ and $r_1 \leq 1$ cm;
74-$R_c \geq 10^4$ and $r_1 \leq 3$ cm (0.05 watt/cm$^2$);
76-$R_c \geq 2000$ and $r_1 \leq 3$ cm;
78-$R_c \geq 2000$ and $r_1 \leq 3$ cm;
80-$R_c \geq 2000$ and $r_1 \leq 3$ cm (0.05 watt/cm$^2$); and
82-$T_c \geq 10^4$ and $r_1 \leq 1$ cm.

Coordinates of typical operating values are shown as circles 84 in the Zone 70.

U.S. Pat. No. 5,783,085 awarded for my invention of a Blood Fractionation Method discloses a process for separating plasma from whole blood with TVF. It describes the nature of the vortices and the boundary layer thicknesses $\delta_1$ and $\delta_2$, defined by Equations 6a & 6b, that envelop them and as illustrated in FIGS. 2A, 2B and 2C.

My '085 blood plasma collection machine is used to remove undesirable suspended particulates from a fluid. The machine incorporates an inner rotating membrane filter to pass selectively fluid component to be separated from a particulate suspension without having particulates plug pores in the membrane.

A vortex will act on any particulate discontinuity with a pressure gradient that drives the particle to the low pressure center of the vortex axis. This occurs whether the particle is a buoyant bubble or denser component, such as particles and bubbles 66 of FIG. 2C. This is a feature that is especially useful for trapping carbon particles being discharged from the hydrogen cracking pyrolysis in an external fuel reformer to be described below in conjunction with FIG. 5A and FIG. 5B.

Ions, on the other hand, are in solution and move hydrodynamically with the fluid or are driven by concentration differences through diffusion accelerated by shear forces. In the case of membrane filtration of suspensions, some particles will be forced against the membrane into the boundary layer which is often referred to as concentration polarization. Although the liquid component is trying to drag particles into and through the pores of the membrane, the extremely high shear rate, referred to above, creates what amounts to a fluidized bed of relatively, but not totally, compacted particles through which the liquid passes.

The maximum rate of liquid filtration (absent fully compacting the polarization layer that would drive the particles into and through the pores) is a linear function of the boundary layer shear rate. The reason membrane filtration of suspensions is so effective with TVF is due to that amplified boundary layer shear rate.

Fuels such as methane, $CH_4$, and propane, $C_3H_8$, at 250° C. to 700° C. and 10 to 40 bar (150 to 600 psi) have kinematic viscosities on the order of 0.01 stoke to 0.03 stoke at the lower and higher temperatures and pressures. These values will apply to parametric designs for steam reforming and pyrolytic fuel cracking, respectively.

Methane and propane are among the more suitable choices for fuels because they have the highest ratios of hydrogen to carbon, are widely available and are simple molecules to break. There are other hydrocarbons that have similar kinematic viscosity properties.

In the case of fuel reformers 14, engineering procedure starts with calculation of a reasonable value for the parameters of Equation 5 to limit power burden to a small fraction of power generated. The density of gasses used in reaction vessels is low and therefore power burden should not be critical.

Construction of TVF electrochemical cells 10 requires mathematical analysis of physical design and operable parameters to select useful values that can be applied to a specific design or embodiment. When the fluid in question is liquid there is a special condition that needs to be imposed, namely, that the power required to rotate the interior member not be too great a fraction of the power produced. Applying this condition to typical fluids used in fuel reformers (e.g. 14) and choosing a reasonable range of rotating member diameters (e.g. $r_1$ and $r_2$ of FIG. 3) will yield an acceptable design and values within a 'Zone of Operable Parameters' 70 of FIG. 4 where RPM is plotted on log-log axes against gap width, d. The 'Zone of Operable Parameters' 70 is understood to indicate practical; but not necessarily exclusive, system design parametric values within which useful TVF may be obtained without turbulence.

Using the stated physical properties, FIG. 4 displays logarithmic plots of Equation 5 for rotational power decrement of 0.05 watt/cm² used to spin the rotating element (e.g. fuel reformer surface layer 24'). This is less than 1% of an expected power density of 5 to 10 watts/cm² in a TVF fuel cell. By comparison, conventional fuel cells produce only 0.5 to 1.0 watt/cm².

The 'Zone of Operable Parameters' area 70 of FIG. 4 covers a range of non-turbulent Reynolds numbers, $R_c$, from 2000 to $10^4$ and values of spinner radius (e.g. $r_1$ in FIG. 3) from about 1 cm to 3 cm. The range of permissible values of gap width, d, in relation to RPM lies between these plot lines 82, 72, 76 and 78. In addition, (Conditions 1 & 2) are shown on the same graph as plot lines 74 and 80. Together, these plot lines form a central 'Zone of Operable Parameters' 70.

For example, one might want to limit the motor speeds to 1800 or 3600 RPM, which are standard 60 Hz electric motor speeds in North America. The range of suitable values for gap, d, appears in FIG. 4 to be about 0.05 to 0.15 cm; but, a wider gap dimension, $d=r_2-r_1$, facilitates higher critical Taylor number, $T_c$, and consequently higher allowed recirculation rates in accordance with the combined application of Equations 2 & 3. This is particularly useful in one configuration that removes water product with the recirculated fuel.

The plot lines 78 and 82 in FIG. 4 bound minimum critical Taylor numbers, $T_c$, which slightly further limit the operable range of values. The boundary layer thicknesses for typical design parameters such as d=0.1 cm and $r_1$=2 cm. are next calculated.

The following table provides some representative values:

| Motor Speed (RPM) | $R_c$ | $\delta_1$ (mm) | Shear Multiplier |
|---|---|---|---|
| 1800 | 3770 | 0.071 | 14.12 |
| 3600 | 7540 | 0.045 | 22.40 |

The range of boundary layer thickness values are somewhat less than, but nearly the same as, currently used in PEM solid polymer membranes. A major difference is the rate of shear-amplified diffusion compared to polymer interstitial transport.

Typical laminar boundary layer shear for a TVF electrochemical cell 10 results in a "Shear Multiplier", as shown above, of as much as 15 to over 20-times the nominal value of $r_1\Omega_1/d$ for a conventional cell. For a TVF fuel reformer 14 using liquid fuel, the value of 1/v will be on the order of 100 sec/cm² and gap, d, in the range of about 0.1 cm. $R_a$ will be roughly 10 times the product of the length of a chamber such as 26 and volumetric exchange rate. If that product is on the order of 10 or 20 (e.g., a meter length can change volume every 5 to 10 seconds, etc.), then it is possible to hold $R_a$ to 200 or less so that a value of $T_c$>$10^4$ will be sufficient in nearly all cases to ensure the establishment of effective TVF 28.

For fuel cell spin rates used in the examples, the Taylor number, $T_c$, is so far above a critical value that it is not necessary to restrict the volumetric recirculation rate as dictated by Equation 3. The volumetric recirculation rate will ultimately be determined by the molar rate of water production or reaction product gas load that needs to be extracted from the cell and exhausted from a separate chamber as steam and gas.

The boundaries of the Zone 70 also define several limiting conditions. For example, there are no useful designs for gap widths d<0.02 cm or d>1.0 cm or for spin rates $\Omega$<200 RPM or n>20,000. Zone 70 displays practical values for a gap width d=0.1 cm. and 1800≦RPM≦3600. Larger gaps on the order of 0.2≦d≦0.3 cm. will require spin rates $\Omega \approx 1{,}000$ RPM.

For the normalized parameter, 0.0067≦d/$r_1$≦1.0, spinner radii should be in the range of 1≦$r_1$≦6 cm. Smaller or larger diameters will only have a small effect on the stated ranges and are unlikely to be preferred in most fuel cell 12 applications.

When fuel is disposed in a chamber (e.g. 26) between rotating and stationary surface layers (e.g. 18' and 24'), several criteria that limit the range of design parameters for liquids, such as methanol, ethanol or kerosene, are much easier to meet with a gas. While kinematic viscosities for methane are nearly an order of magnitude larger than for the liquids, corresponding specific gravities are somewhat more than two orders of magnitude lower. Since the expended rotational power density varies as $\rho v^{1/3}$, power required to spin the rotating member (e.g. 24) is very much less for methane and can be ignored.

If there is a reason to construct a miniature device with $r_1 \approx 1$ cm and d≈0.1 cm, then the criteria for establishing TVF would be met for RPM>1000. To ensure flows will not be turbulent, 1000<RPM<6500.

For larger devices where $r_1 \approx 5$ cm and d≦1 cm, there is no difficulty satisfying the Taylor criterion. To avoid turbulence, the RPM should be <1100.

Figure 5A:
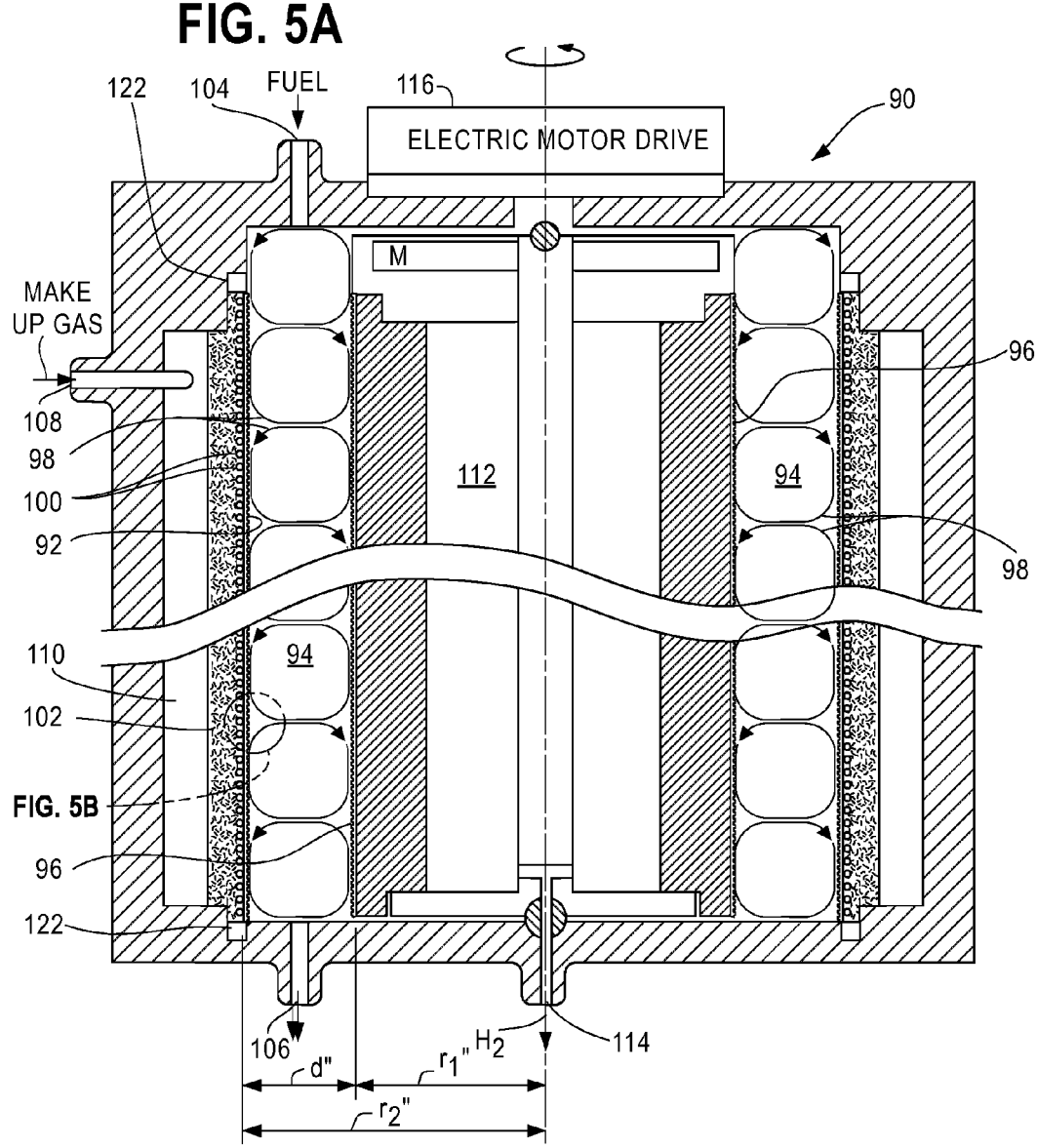
FIG. 5A and FIG. 5B are cross-sectional views of portions of a fuel chamber of an external TVF fuel reformer.
Figure 5B:
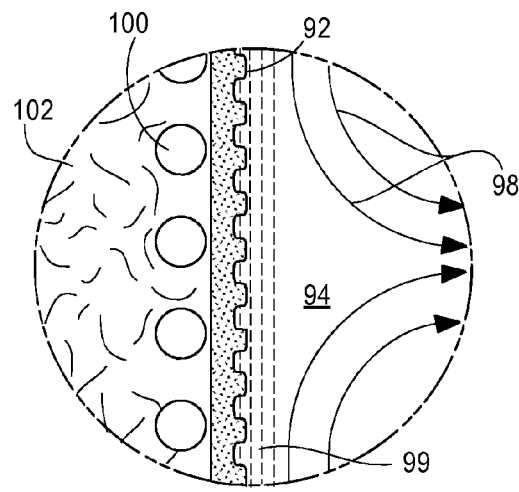

FIG. 5A and FIG. 5B are cross-sectional views of portions of an external TVF fuel reformer 90 suitable for a) pyrolytic or b) steam or partial oxidation reforming of the hydrocarbon fuels, such as those enumerated above, and other fuels such as $NH_3$ and $NaBH_4$. Note that FIG. 5A and FIG. 5B illustrate common structures that TVF reformers 90 share for each of these fuels. Balance-of-plant (BOP), as well as operating temperatures, pressures, chemical reactions, byproducts and contaminants capable of damaging catalytic surfaces or electrodes, are usually different for each of the different fuels.

The TVF fuel reformer 90 has one active cylindrical catalytic surface layer 92 having a radius $r_2$" forming an outer wall of fuel chamber 94. The catalytic surface layer 92 is fixed in position. Cylindrical permeable filter layer 96 having a radius $r_1$" forms the inner wall of the fuel chamber 94 and is journaled for rotation within catalytic surface layer 92. The distance between the surface layer 92 and the filter layer 96 constitutes a gap d" in which TVF 98 and CCF 99 are formed. The TVF fuel reformer 90 could also be constructed with a rotating catalytic surface layer 92 and a fixed filter layer 96 or both layers 92 and 96 could rotate without departing from the scope of this invention.

In one lower cost embodiment, catalytic surface layer 92 is constructed of catalytic nickel embedded in porous or otherwise permeable stainless steel. A choice of fuels may require use of a different catalytic material such as copper cermets or precious or transition metal alloys. The catalytic surface layer 92 abuts optional heating element 100, also shown in FIG. 5B, that provides thermal energy for an endothermic fuel reforming chemical reaction at the catalyst surface 92. The heating element 100 is typically supported by a #316 stainless steel porous web 102, which is porous to air, nitrogen or any inert gas.

Fuel for reforming (e.g. $CH_4$ or $CH_3OH$) enters the fuel chamber 94 through fuel entry port 104. Makeup gas, comprising soot-free inert gas from fuel chamber 94 passing through fuel chamber exit port 106, and additional external gas required to maintain pressure in fuel chamber 94 is pumped from BOP through makeup gas input port 108 and into makeup gas chamber 110. The makeup gas passes from makeup gas chamber 110 through porous web 102 into fuel reformer chamber 94. If a steam reforming and/or partial oxidation process is employed, then steam enters at makeup gas input port 108 along with such air supplying oxygen plus inert gas as required. For a basic pyrolysis process, make-up gas consists mainly of nitrogen or other inert gas plus just enough air/oxygen to prevent carbon adsorption on the catalyst surface layers 92.

In all cases, the hydrogen formed by interaction of the fuel gas with the hot (e.g. 700° C. for pyrolytic reforming) catalytic surface layer 92 passes through hydrogen-permeable filter layer 96 into hydrogen capture chamber 112 and exits at hydrogen chamber exhaust port 114.

An electric motor 116 is coupled to cylindrical permeable filter layer 96 to cause it to rotate within cylindrical catalytic surface layer 92. Boundaries of the Zones Of Operating Regions For A Pyrolytic TVF Reformer 118a of FIG. 6A or Zones Of Operating Regions For A Steam Or Partial Oxidation TVF Reformer 118b of FIG. 6B also define several limiting conditions for rotational speed RPM in terms of gap width d" for creating stable TVF in the external fuel reformer 90 fuel chamber 94.

Figure 6A:
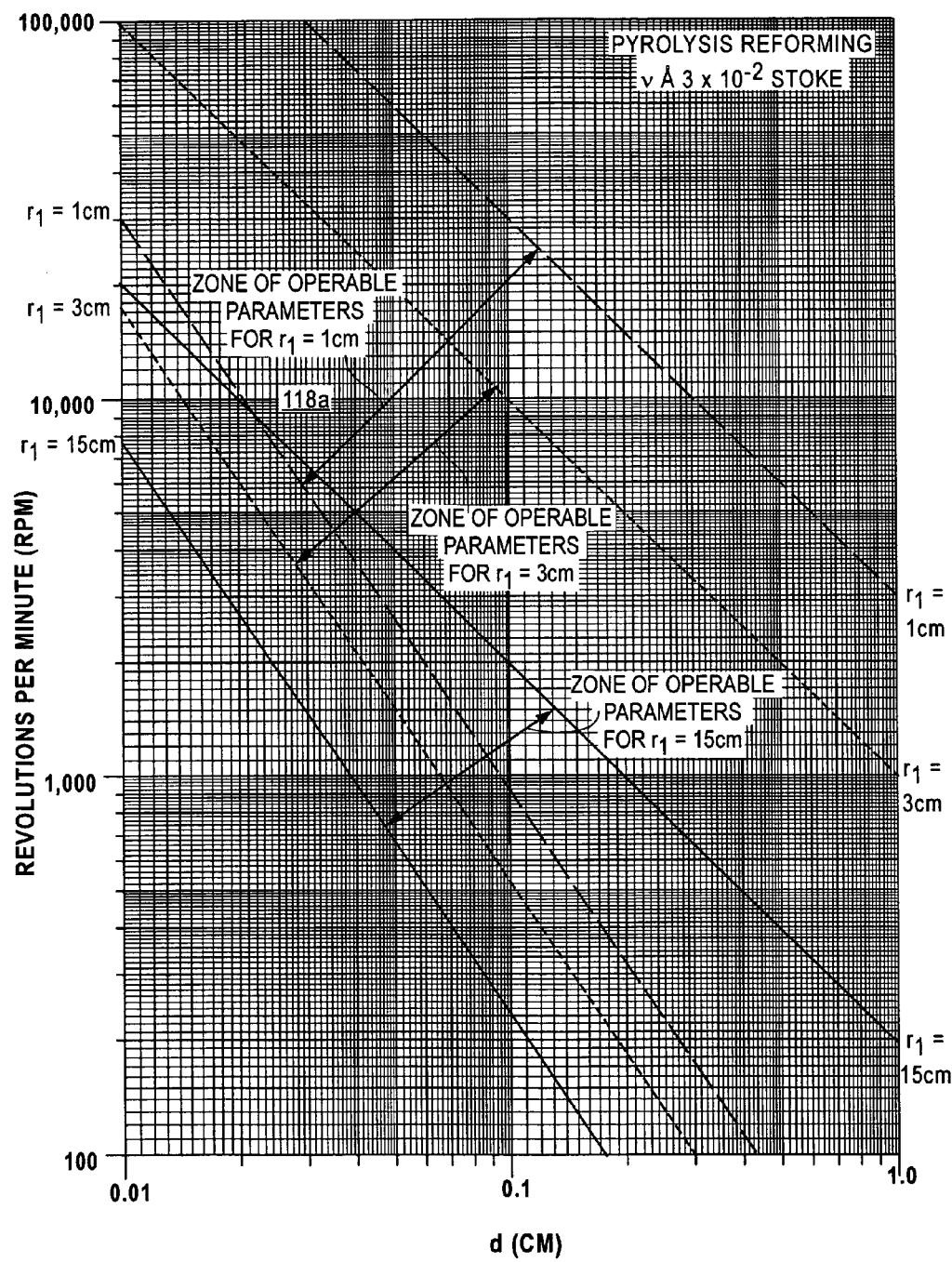
FIG. 6A is a log-log graph of Revolutions Per Minute (RPM) as a function of gap width, d, for a range or zone of operable conditions in a pyrolytic reformer for typical fuel gasses.
Figure 6B:
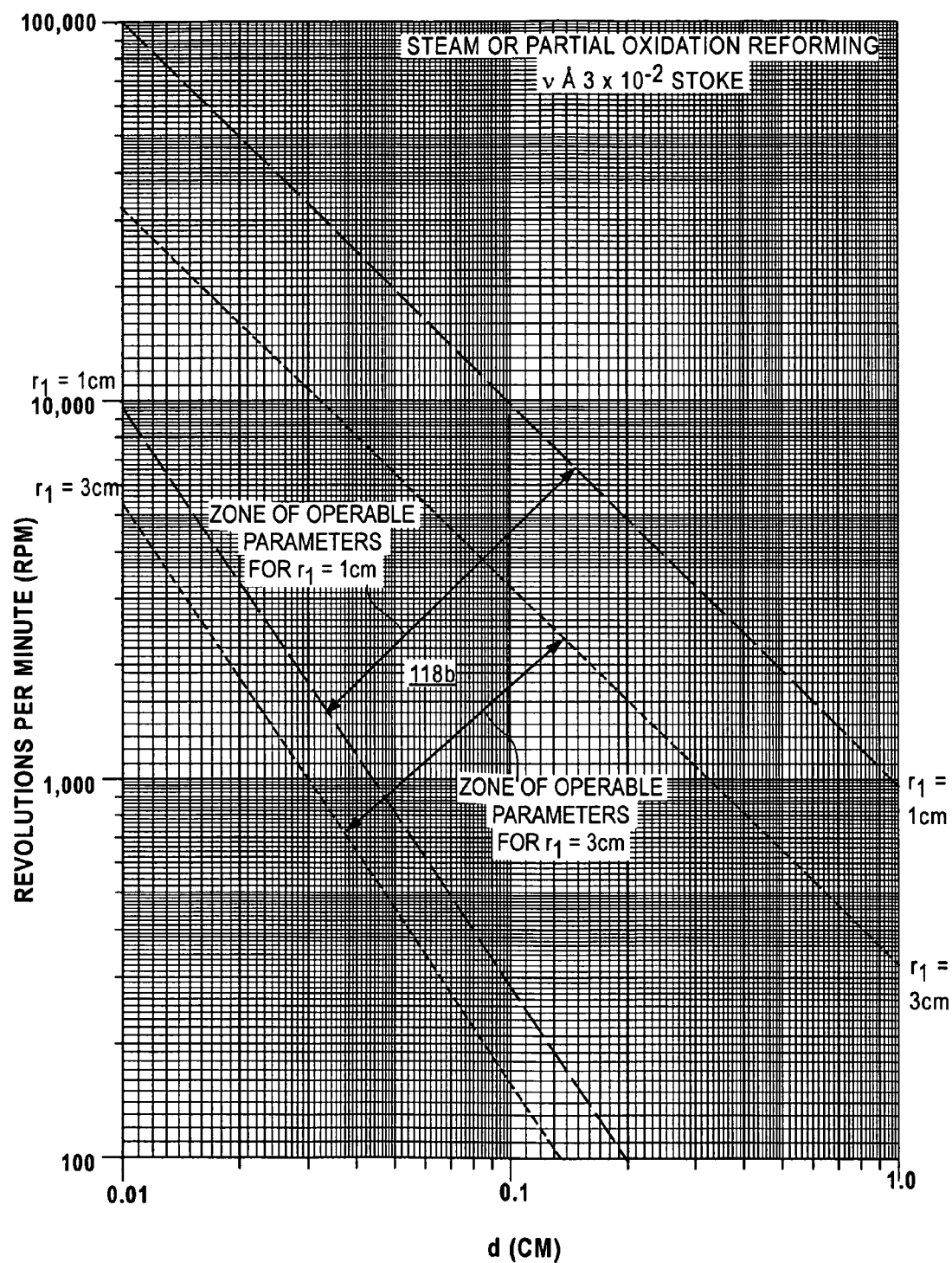
FIG. 6B is a log-log graph of Revolutions Per Minute (RPM) as a function of gap width, d, for a range or zone of operable conditions in a steam or partial oxidation reformer for typical fuel gasses.

FIG. 6A and FIG. 6B apply to external fuel reformers 90 in general or specifically to the DIR section (e.g. 14) of a fuel cell (e.g. 12); however, the latter can only use steam with or without partial oxidation because of temperature limitations of fuel cell catalysts and electrodes. Because the densities and viscosities of the several gasses, including steam, vary considerably between the conditions of medium and high temperature reforming; it is necessary to treat pyrolysis at 700° C. and steam at 250° C. as separate cases.

Fuel viscosities range between $2\text{-}4 \times 10^{-4}$ poise while densities range between $1.4\text{-}2.8 \times 10^{-2}$ gm/ml at the temperatures and pressures stated above. Operating pressure for pyrolysis is about 40 bars. For DIR in a fuel cell, operating pressure is about 10 bars.

Most practical engineering values can be obtained by using kinematic viscosities of $3 \times 10^{-2}$ Stoke for pyrolytic reforming and $1.0 \times 10^{-2}$ Stoke for fuel cell DIR or steam or partial oxidation external reforming. Because fluid densities are low, rotation power consumption may be ignored.

FIG. 6A and FIG. 6B have been plotted for a range of rotating filter surface layer 96 radii and display boundaries of Zones Of Operable Parameters For A Pyrolytic TVF Reformer 118a (1 cm≦$r_1$≦15 cm) of FIG. 6A or Zones Of Operable Parameters For A Steam Or Partial Oxidation TVF Reformer 118b (1 cm≦$r_1$≦3 cm) of FIG. 6B for the defined range of rotating filter 96 radii $r_1$. Fuel reformers can be constructed for different sizes that are outside of the range that has been described and will have different Zones of Operable Parameters. However, the plots in FIG. 6A and FIG. 6B illustrate the parametric selection protocol.

In the simplest application of these TVF fuel reformers 90, namely, pyrolytic cracking, the hydrogen gas may be sufficiently pure that the rotating porous filter layer 96 need only be made of gas permeable sintered metal or ceramic capable of withstanding temperatures to 700° C. In this case, no secondary filtering of the hydrogen gas is required because the only possible source of contaminants is leakage of trace amounts of makeup gas through internal seals protecting bearings for rotating components. In other processes where the byproduct gas contains objectionable contaminants, the rotating permeable filter layer 96 can be made from hydrogen-selective palladium, platinum/palladium or palladium alloy membranes.

For long term maintenance, it is preferable to introduce a small, continuous amount of oxidizing gas, such as air, into the make-up gas input port 108 and through the makeup gas chamber 110 to porous web 102 and catalyst surface layer 92 to oxidize any carbon adhering to the catalyst surface layer 92. A specific catalyst should be selected for the fuel being reformed that will preferentially attract hydrogen atoms to its surface layer 92 to form a momentary metal hydride that breaks the carbon bond. This reaction will then release carbon into the flow stream so that the carbon will be drawn into TVF 98. The reaction will also release the hydrogen through thermal dissociation. Some metal oxides will promote these reactions without additional oxygen. Other catalysts may also promote another reaction in which the oxygen momentarily bonds with $H_2$ to form water and then a water shift reaction uses the carbon to form $CO_2$. Although most of the hydrocarbon bond-breaking will occur in the absence of direct carbon attachment to the catalyst surface 92, these reactions will prevent carbon buildup as in a continuous self cleaning oven.

Another means for extracting attached carbon buildup from the catalyst surface layer 92 and into the flow stream where it is easily captured and disposed of by TVF 98 comprises mechanical transducers 122 (e.g. piezoelectric materials) vibrating at 50 to 150 kHz mechanically that are coupled to the catalytic surface layer 92. These vibrations provide energy for self-cleaning of the catalyst surface layer 92. Mechanical transducers 122 are easily attached to the catalyst surface layer 92 and facilitate the use of cheaper catalysts.

The outer active cylindrical catalytic surface layer 92 can be constructed from any of a wide variety of materials, depending upon the reforming process being used. Steam reforming catalysts may contain nickel. Pyrolytic cracking processes can incorporate a less expensive nickel-containing stainless steel.

Current state of the art systems employing nickel and nickel alloys are susceptible to very damaging carbon fouling issues that are hard to control. Commercially available nickel-alloy catalysts may also contain elements such as copper, potassium and molybdenum to reduce carbon-fouling difficulties; but, these alloys do not always reduce fouling to an acceptable level.

For direct pyrolysis, sintered stainless steel not necessarily containing nickel can be employed in the catalyst surface layer 92. When used in a catalyst of a conventional fuel reformer, stainless steel increases the carbon fouling potential. In a TVF reformer 90, carbon dust has little, if any, opportunity to adhere to the catalytic surface layer 92 because of high shear strength laminar CCF boundary layers 99 (FIG. 5B) at the surface layer 92 and because of a very strong negative pressure gradient toward the center of the gap d" of fuel chamber 94 between the facing porous surface layers 92 and 96 due to the high-laminar-shear CCF at the boundary layer 99. Any small amounts of carbon that may adsorb to the catalyst surface layer 92 can be burned or vibrated away, as described above. The carbon dust is rapidly drawn radially inward through the boundary layer where the dust enters TVF 98. Once inside TVF 98 the carbon dust will be instantly be trapped and moved to the center of the TVF 98 where the dust will be accumulated and carried away with the TVF 98.

When a fluid is pumped axially from the entry port 104 to the exit port 106, it does not flow through the TVF 98. The TVF 98 move axially while fully retaining their established form. Consequently, whatever enters and is trapped (e.g. carbon dust, soot, etc.) in the TVF 98 remains trapped as the TVF 98 move all the way to the exit port 106.

The fluid media comprising the high-laminar-shear laminar CCF boundary layers 99 and TVF 98 are the fuel and the reactant gasses. These are rapidly and repetitively exchanged between porous surface layers 92 and 96 by convective transport and boundary layer diffusion in the same manner as dissolved ions and water in a fuel cell 12 in accordance with this invention. These factors substantially accelerate fuel reforming per unit area of active surface over any method of current art.

In TVF fuel reformers 90, it is desirable to maintain pressure in fuel chamber 94 to support and carry the carbon dust-laden TVF 98 to exit port 106 as fuel is converted to hydrogen and dry carbon. If all the hydrogen is removed, except for contaminants that might oxidize carbon, then there would be little or no gas left in fuel chamber 104. For this reason, a neutral gas is introduced through makeup gas input port 108 and makeup gas input chamber 110 through the porous catalytic surface layer 92 to maintain gas pressure within the fuel chamber 94.

BOP contains a heat exchanger (not shown) for extracting heat energy from hot byproduct gas passing through fuel chamber exit port 106 to raise the temperature of makeup gas entering makeup gas input port 104. The cooled byproduct gas is filtered to safely deposit entrained carbon dust or soot in a chamber (not shown) designed to trap the carbon dust and recant the gas for recirculation as makeup gas. These external facilities are BOP components.

Recirculated gas can be pure nitrogen or a noble gas and it can include fresh pressurized air and/or steam that serve a different purpose. For example, some fuels are processed using steam reforming or partial oxidation reactions that make $CO_2$ or CO that enters a subsequent shift reaction to become $CO_2$. In some cases, air supplies oxygen to react with the fuel in order to heat and maintain the temperature of the catalytic surface 92 where the fuel→$H_2$ reaction takes place. It is common practice to limit the amount of oxygen fed to a combustible fuel mixture in order to avoid explosion hazard and to employ steam vapor as an additional protection. As described above, recirculation maintains gas pressure and allows for the measured introduction of air.

TVF fuel reformers 90 are unique because a combination of these normally separate processes can be carried out simultaneously so that the fraction of $C/CO_2$ produced per mole of hydrogen extracted can be adjusted. Furthermore, the limited oxygen partial pressure passing over hot surfaces of the catalyst surface 92 will continuously oxidize any carbon that manages to adhere. This feature eliminates a necessity of periodic shut down and maintenance.

For these additional reactions the catalyst surface layer 92 may comprise alloyed nickel crystallites, copper cermets, platinum, palladium or gold on ceramic. Iron-chromium catalyst is effective to promote the shift reaction in steam reforming and it is entirely possible to mix various catalysts on the same substrate to cause rapid sequential reactions to drive the overall reaction to the preferred result or end product.

The accelerated efficiency of the many simultaneous reactions that can be implemented without fear of carbon fouling or catalyst damage is a direct consequence of the advantages of TVF fuel reformers 90. This permits a reduction in the amount of prepared catalytic surface layer 92 area required to process a given amount of fuel. However, to take full advantage of TVF 98, the catalyst surface layer 92 loading factor per unit area of roughened active surface should be increased over that which is normally practiced. Therefore, the catalyst surface layer 92 cost may be the same as that for conventional fuel reformers of the same size; but, smaller capacity.

In summary, some of the principal benefits of TVF in a fuel reformer include 1) all fuel is exposed to the catalytic surface layer 92 for rapid reaction, and 2) carbon dust, soot and other contaminants are dislodged, collected and removed from the fuel chamber 94 so that the catalytic surface layer 92 remains clean. Because of their enhanced reaction rates and their inherent ability to purge carbon dust, soot and other contaminants, TVF fuel reformers 90 have lower maintenance costs, smaller sizes and lower capital and operating costs than conventional fuel reformers—whether configured for direct internal reforming or as external fuel reformers.

All patents identified in this disclosure are hereby incorporated herein by reference.

While the present disclosure has been presented above with respect to the described and illustrated embodiments of fuel reformers using TVF, it is to be understood that the disclosure is not to be limited to those alternatives and described embodiments. Accordingly, reference should be made primarily to the following claims to determine the scope of my invention.

I claim:

1. In a fuel reformer (14, 90), an improvement comprising: means (18', 24' or 92, 96) for creating Taylor Vortex Flows (28, 98) in fuel.

2. In the fuel reformer (14, 90) of claim 1, an improvement comprising:
   means (18', 24' or 92, 96) for creating Circular Couette Flows (58, 99) in the fuel.

3. In the fuel reformer (14, 90) of claim 1, an improvement comprising:
   a. a catalyst surface layer (18', 24', 92); and
   b. means (108, 110, 102) for extracting carbon buildup from the catalyst surface layer (18', 24', 92) for capture and disposal by Taylor Vortex Flows (98).

4. In the fuel reformer (14, 90) of claim 3 having a catalyst surface layer (18', 24', 92), an improvement comprising:
   a. means for passing makeup gas through the catalyst surface (18', 24', 92); and
   b. means (108, 110, 102) for introducing oxidizing gas into the make-up gas to oxidize any carbon adhering to the catalyst surface (18', 24', 92).

5. In the fuel reformer (14, 90) of claim 3, an improvement comprising:
   a vibrating transducer (122) that is mechanically coupled to the catalytic surface layer (92).

6. In the fuel reformer (14, 90) of claim 1 in which the means (18, 24 or 92, 96) for creating Taylor Vortex Flows (28 or 98) includes a first cylindrical surface layer (24' or 92) enclosing a second cylindrical surface layer (18' or 96) separated from the first by a fuel chamber (26 or 94) of gap distance d and length L and means (116) for rotating one surface layer with respect to the other at $\Omega$ radians per second, further comprising:
   a. means for pumping fuel into and out of the chamber (26 or 94) at a total volumetric exchange rate of $\dot{U}/U$ where U is the volume of the fuel in the chamber and $\dot{U}$ is the volumetric rate of flow into and out of the chamber; and
   b. means for regulating the volumetric exchange rate of axial flow and Taylor Number $T_c$ of vortex flow (28 or 98) in the the fuel so that—
      i. $T_c = 2r_2 \Omega^2 d^3/v^2(1+\{r_1/r_2\}) > 1,715(f\{R_a\})$, and;
      ii. $R_c = \{\Omega r_1 d/v\} \leq 10^4$
   where:
      1. $f\{R_a\} = 1.0 + (0.297)(\log_{10} R_a)^{4.04342}$ for $R_a \geq 1.0$
         $f\{R_a\} = 1.0$ for $0 \leq R_a \leq 1.0$,
      2. $r_1$=radius of the first surface layer (18' or 92),
      3. $r_2$=radius of the second surface layer (24' or 96),
      4. $d = r_1 - r_2$,
      5. $v$=kinematic viscosity of the fuel $\mu$(poise)/$\rho$(grams/cc.),
      6. $R_a = (dL/v)(\dot{U}/U)$, and
      7. $\dot{U}/U \geq 0$.

7. In the fuel reformer (14 or 90) of claim 6 wherein:
   RPM=30 $\Omega/\pi$, coordinates of d and RPM are within a Zone of Operable Parameters (118a or 118b).

8. In the fuel reformer (14 or 90) of claim 6 wherein:
   the first surface layer (24' or 92) is reactive with the fuel to create hydrogen.

9. A fuel reformer (14 or 90) comprising:
   a. first and second surface layers (18', 24', or 92, 96) separated by a fluid chamber (26 or 94); and
   b. means (18', 24' or 92, 96) for rotating one of the surface layers with respect to the other to create Taylor Vortex Flows (28, 98) that extract unwanted contaminants (66) in fuel.

10. The fuel reformer (14 or 90) of claim 9, comprising:
    means (18', 24' or 92, 96) for creating Circular Couette Flows (58, 99) in the fuel.

11. In the fuel reformer (14 or 90) of claim 9 in which the means (18', 24' or 92, 96) for creating Taylor vortex flows (26 or 98) includes a first inner surface layer (18' or 92) adjacent a second outer surface layer (24' or 96) separated from the first by a fuel chamber (26 or 94) with—
    i. gap distance d (d or d"),
    ii. gap length L, and
    iii. means (116) for rotating one surface (24' or 96) with respect to the other surface layer (18' or 92) at $\Omega$ radians per second,
    further comprising:
    a. means for pumping fuel into and out of the chamber (26 or 94) at a total volumetric exchange rate of $\dot{U}/U$ where U is the volume of fuel in the chamber and $\dot{U}$ is the volumetric rate of flow into and out of the chamber (26 or 94); and
    b. means for regulating the volumetric exchange rate of axial flow and Taylor Number $T_c$ of vortex flow in the the fuel so that—

$T_c = 2r_2 \Omega^2 d^3/v^2(1+\{r_1/r_2\}) > 1,715(f\{R_a\})$, and;

$R_c = \{\Omega r_1 d/v\} \leq 10^4$ where:
    1. $f\{R_a\} = 1.0 + (0.297)(\log_{10} R_a)^{4.04342}$ for $R_a \geq 1.0$
       $f\{R_a\} = 1.0$ for $0 \leq R_a \leq 1.0$
    2. $r_1$=the smallest radius of the first inner surface layer (18', 96),
    3. $r_2$=the largest radius of the second outer surface layer (24', 92),
    4. $v$=kinematic viscosity of fuel=$\mu$(poise)/$\rho$(grams/cc.),
    5. $R_a = (dL/v)(\dot{U}/U)$, and
    6. $\dot{U}/U \geq 0$.

12. A chemical cell (14 or 90) comprising:
    a. a first surface layer (24' or 92) that is reactive with a chemical entering its pores (68 to produce hydrogen;
    b. a second surface layer (18' or 96) that is adjacent the first surface layer (24' or 92) so that a chamber (26 or 94) is created between the surface layers (18', 24', or 92, 96);
    c. A chemical containing hydrogen in the chamber (26 or 94); and
    d. means (116) for moving one surface layer (24' or 96) with respect to the other surface (18' or 92) to create Taylor Vortex Flows (28, 58, 59 or 98, 99) in the chemical in the chamber (26 or 94)
    so the chemical can be reformed to produce hydrogen.

13. The chemical cell (14 or 90) of claim 12 wherein:
    a. the first surface layer (24' or 92) is cylinder-like; and
    b. the second surface layer (18' or 96) is cylinder-like and located substantially parallel to and within the first cylindrical surface layer (24' or 92) so as to create the chamber (26 or 94) for the chemical between the surface layers (18', 24' or 92, 96).

14. The chemical cell (14 or 90) of claim 12 wherein the flows in the chemical in the chamber (26 or 94) comprise:
   Circular Couette Flows (58, 99) surrounding Taylor Vortex Flows (28, 50 or 98).

15. The chemical cell (14 or 90) of claim 12 wherein the chemical is selected from a group comprising:
   methane ($CH_4$), methanol ($CH_3OH$), ethanol ($C_2H_5OH$), propane ($C_3H_8$), butane ($C_4H_{10}$), octane ($C_8H_{18}$), kerosene ($C_{12}H_{26}$), gasoline, ammonia ($NH_3$) and sodium borohydride ($NaBH_4$).

16. A process for operating a chemical cell (14 or 90) to produce hydrogen comprising:
   a. Pumping a chemical into a chamber (26 or 94) having an inner cylindrical surface layer (18' or 96) and an outer cylindrical surface layer (24' or 96); and
   b. Rotating one of the surface layers (24' or 96) with respect to the other surface (18' or 92) at a rate sufficient to form Taylor Vortex Flows (28, 50 or 98) in the chemical in the chamber (26 or 94).

17. The process of operating a chemical cell (14 or 90) of claim 16 wherein:
   Circular Couette Flows (58, 99) surround the Taylor Vortex Flows (28, 50, 98).

18. The process for operating a chemical cell (14 or 90) of claim 16 wherein the chemical is selected from a group comprising:
   methane ($CH_4$), methanol ($CH_3OH$), ethanol ($C_2H_5OH$), propane ($C_3H_8$), butane ($C_4H_{10}$), octane ($C_8H_{18}$), kerosene ($C_{12}H_{26}$), gasoline, ammonia ($NH_3$) and sodium borohydride ($NaBH_4$).

19. The process for operating a chemical cell (14 or 90) claim 16 in which the cell (10) contains a fuel reformer chamber (26) between a fixed surface layer (18', 92) and a rotating surface layer (24', 96) and the process comprises an additional step of:
   a. Pumping a fuel containing hydrogen atoms into the fuel reformer chamber (26, 94); and
   b. Rotating the reformer rotating surface layer (24) at a speed sufficient to cause—
      i. fuel reformer Taylor Vortex Flows (28, 50, 98) in reformer chamber (26), and
      ii. $H_2$ from the fuel to pass through one of the surface layers (18', 24', 92, 96).

20. The process for operating a chemical cell (14 or 90) claim 19 wherein:
   Circular Couette Flows (59, 99) surround the Taylor Vortex Flows (28, 50, 98) in the reformer chamber (26, 94).

21. A chemical cell (14 or 90) comprising:
   a. a first surface layer (24' or 92) containing porous catalyst;
   b. a second surface layer (18' or 96);
   c. the first surface layer (24' or 92) and the second surface layer (18' or 96) defining a chamber (26 or 94) between the surface layers (18', 24', 92, 96) and the chamber (26 or 94) including an input tube (22 or 98) configured so that a fluid passing through the chamber (26 or 94) from the input tube (22 or 104) passes adjacent the first and second surface layers (18', 24' or 92, 96); and,
   d. the chamber (26 or 94) being dimensioned, and at least one of the surfaces (24' or 96) being configured to rotate relative to the other surface layer (18' or 92) at an adequate rate of rotation to produce Taylor Vortex Flows (28 or 98) within the fluid flowing from the input tube (22 or 104) through the chamber (26 or 94).

22. The chemical cell of claim 21 comprising in addition:
   Circular Couette Flows (58, 99) surrounding the Taylor Vortex Flows (28, 98) in the reformer chamber (26, 94).

23. The chemical cell of claim 22 comprising in addition:
   protuberances (60) that extend from the first surface layer (18', 24', 92, 96) into the Circular Couette Flows (59, 99).

24. The chemical cell of claim 21 wherein the porous catalyst comprises:
   nanoporous metal foam scaffold (67) having pores (68) surrounded by struts (69).

25. The chemical cell of claim 24 where the struts (69) are:
   decorated by catalyst particles.

26. The chemical cell of claim 24 wherein the foam scaffold (67) includes a metal selected from:
   the Table of the Elements Platinum Metals Group.

27. The chemical cell of claim 24 wherein the foam scaffold (67) includes a metal selected from:
   the Table of the Elements Group 10.

28. A chemical cell (10) comprising:
   a. a fuel reformer (14) containing a catalytic shell surface layer (18') and a second surface layer (24') that are separated by a fuel chamber (26) to permit one layer to rotate within the other layer and the fuel chamber having a gap distance $d_1$ and a gap length $L_1$
   b. fuel cell (12) containing electrodes (34, 36) that are separated by an electrolyte chamber (40) to permit one electrode (34) to rotate within the other electrode (36) and the electrolyte chamber (40) having a gap distance $d_2$, and gap length $L_2$;
   c. means for rotating one surface layer (18', 24') with respect to the other surface layer (24', 18') at $\Omega_1$ radians per second to create Taylor Vortex Flows in the fuel chamber (26);
   d. means for rotating one electrode (36, 34) with respect to the other electrode (34, 36) at $\Omega_2$ radians per second to create Taylor Vortex Flows in the electrolyte chamber (40);
   e. means for pumping fuel into and out of the fuel chamber (26) at a total volumetric exchange rate of $\dot{U}_1/U_1$ where U is the volume of fuel in the chamber (26) and $\dot{U}_1$ is the volumetric rate of flow into and out of the chamber (26);
   f. means for pumping electrolyte into and out of the electrolyte chamber (40) at a total volumetric exchange rate of $\dot{U}_2/U_2$ where $U_2$ is the volume of electrolyte in the chamber (40) and $\dot{U}_2$ is the volumetric rate of flow into and out of the chamber (40); and
   g. means for extracting hydrogen from the fuel reformer (14) and passing the hydrogen through the fuel cell electrode (34) for a reduction reaction.

29. The chemical cell (10) of claim 28 comprising in addition:
   means for regulating the volumetric exchange rate of axial flow and Taylor Number $T_c$ of Taylor Vortex Flows in the electrolyte chamber (40) and fuel chamber (26) so that for x=1 or 2—

$$T_c = 2r_2\Omega^2 d_x^3/\nu^2(1+\{r_1/r_2\}) > 1{,}715(f\{R_a\}), \text{ and;}$$

$$R_c = \{\Omega r_1 d/\nu\} \leq 10^4$$

where:
1. $f\{R_a\} = 1.0 + (0.297)(\log_{10} R_a)^{4.04342}$ for $R_a \geq 1.0$
   $f\{R_a\} = 1.0$ for $0 \leq R_a \leq 1.0$
2. $r_1$=the largest radius of the first electrode or layer,
3. $r_2$=the smallest radius of the second electrode or layer, 4. v=kinematic viscosity of electrolyte or fuel=µ (poise)/µ (grams/cc.),
5. $R_a = (dL_x/v)(\dot{U}/U)$, and
6. $\dot{U}/U \geqq 0$.

30. A chemical cell (14, 90) comprising:
a. a first surface (24', 92) that contains a catalyst,
b. a second surface (18', 96),
c. a fluid between the surfaces (18' 92 and 24', 96), and
d. means (18' 92 or 24', 96 and 116) for generating Taylor Vortex Flows (28, 50, 98) in the fluid that is enveloped by a laminar shear boundary (58, 59, 99) adjacent to one of the surfaces (18', 24', 92, 96).

* * * * *